US012437569B1

(12) United States Patent
Rangarajan et al.

(10) Patent No.: US 12,437,569 B1
(45) Date of Patent: Oct. 7, 2025

(54) AI-BASED DETECTION OF CONTEXTUAL CLASS DESCRIPTION IN DOCUMENT IMAGES

(71) Applicant: FIRST AMERICAN FINANCIAL CORPORATION, Santa Ana, CA (US)

(72) Inventors: Arun Rangarajan, Irvine, CA (US); Calvin Powell, Villa Park, CA (US); Zheqi Tan, Madison, WI (US); Madhu Kolli, Tustin, CA (US); Prabhaker Narsina, Irvine, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 468 days.

(21) Appl. No.: 17/749,650

(22) Filed: May 20, 2022

(51) Int. Cl.
*G06K 9/00* (2022.01)
*G06V 30/18* (2022.01)
*G06V 30/413* (2022.01)

(52) U.S. Cl.
CPC ...... *G06V 30/413* (2022.01); *G06V 30/18171* (2022.01)

(58) Field of Classification Search
CPC .... G06V 30/2253; G06V 30/40; G06V 30/41; G06V 30/224; G06V 10/22
See application file for complete search history.

(56) References Cited

U.S. PATENT DOCUMENTS

| | | | |
|---|---|---|---|
| 11,789,990 B1* | 10/2023 | Fouad | G06F 16/35 707/736 |
| 2016/0055375 A1* | 2/2016 | Neavin | H04N 1/00 382/218 |
| 2020/0320289 A1* | 10/2020 | Su | G06V 30/413 |
| 2020/0394396 A1* | 12/2020 | Yanamandra | G06V 30/413 |
| 2022/0237398 A1* | 7/2022 | Asermely | G06F 3/0483 |

* cited by examiner

*Primary Examiner* — Avinash Yentrapati
(74) *Attorney, Agent, or Firm* — Sheppard, Mullin, Richter & Hampton LLP

(57) ABSTRACT

Some implementations of the disclosure describe a non-transitory computer-readable medium having executable instructions stored thereon that, when executed by a processor, cause the processor to perform operations comprising: obtaining a document image file including a first image corresponding to a first page of a document; generating, using a first trained model, based on the first image, a first prediction that the first page includes a term identifying a class of people, the first prediction including a first location of the term within the first image; in response to generating the first prediction that the first page includes the term identifying the class of people, generating, using a second trained model, based on the first image, a second prediction of whether or not the first page includes a section that uses a term identifying a class of people in a specific context.

20 Claims, 23 Drawing Sheets

Warranty Deed

KNOW ALL MEN BY THESE PRESENTS, That Washington Cemetery Association, a corporation organized and existing under the laws of the State of Washington, in consideration of the sum of ... Ten ($10.00) ... Dollars in hand paid this date, receipt whereof is hereby acknowledged, does hereby grant, bargain, sell, convey, subject to conditions, limitations, privileges and restrictions hereinafter provided ... , Grantee, the following described land, to-wit: ... situated in King County, State of Washington, as shown by the plat of said Memorial Park on file in the office of Washington Cemetery Association, as a place of interment, and for no other purpose. For purposes of its ...

*Grantee not only.*

FIG. 2B

African

Japanese

Chinese

Mongolian

FIG. 3B imposed upon each and every parcel of said property as a servitude in favor of each and every parcel thereof as the dominant tenement or tenements, in addition, to wit:

SECTION 1. All of the provisions, restrictions, conditions and agreements set forth in this Declaration shall affect each and all of the lots delineated on said Map, shall run with the land and be real estate and be binding until the first day of January, 1991, when they shall in all respects terminate and be of no further effect, unless prior to said January, 1991, the owners of record of seventy-five per cent (75%) of the lots in said subdivision shall by written instrument, duly executed and recorded in the same manner as grants of real property, declare a continuation or modification of the same, in which event same shall continue for a further period of time and in such manner as in such declaration provided. The restrictions referring to persons who are not of the white or Caucasian race shall be perpetual.

SECTION 2. All of the said restrictions, conditions, covenants, provisions and agreements are made for the mutual and reciprocal benefit of each and every lot shown on said map,

FIG. 3C upon each and every parcel of said property as a servitude in favor of each and every parcel thereof as the dominant tenement or tenements, as fellows, to wit.

SECTION 1. All of the provisions, restrictions, conditions and agreements set forth in this Declaration shall affect each and all of the lots delineated on said Map, shall run with the land and shall exist and be binding until the first day of March, 1985, when they shall in all respects terminate and be of no further effect, unless prior to said March 1985, the owners of record of seventy-five percent (75%) of the lots in said subdivision shall by written instrument, duly executed and recorded in the same manner as grants of real property, declare a continuation or modification of the same, in which event same shall continue for a further period of time and in such manner as in such declaration provided. The restrictions referring to persons who are not of the white or Caucasian race shall be perpetual.

SECTION 2. All of the said restrictions, conditions covenants, provisions and agreements are made for the mutual and reciprocal benefit of each and every lot shown on said map, and are intended to create mutual equitable servitudes upon each of said lots in favor of every other lot shown on said map, to create reciprocal rights between the respective owners of all of the lots shown on said map,

FIG. 4 upon each and every parcel of said property as a servitude in favor of each and every parcel thereof as the dominant tenement or tenements, as fellows, to wit.

SECTION 1. All of the provisions, restrictions, conditions and agreements set forth in this Declaration shall affect each and all of the lots delineated on said Map, shall run with the land and shall exist and be binding until the first day of March, 1985, when they shall in all respects terminate and be of no further effect, unless prior to said March 1985, the owners of record of seventy-five percent (75%) of the lots in said subdivision shall by written instrument, duly executed and recorded in the same manner as grants of real property, declare a continuation or modification of the same, in which event same shall continue for a further period of time and in such manner as in such declaration provided. The restrictions referring to persons who are not of the white or Caucasian race shall be perpetual.

SECTION 2. All of the said restrictions, conditions covenants, provisions and agreements are made for the mutual and reciprocal benefit of each and every lot shown on said map, and are intended to create mutual equitable servitudes upon each of said lots in favor of every other lot shown on said map, to create reciprocal rights between the respective owners of all of the lots shown on said map,

FIG. 5 upon each and every parcel of said property as a servitude in favor of each and every parcel thereof as the dominant tenement or tenements, as fellows, to wit.

SECTION 1. All of the provisions, restrictions, conditions and agreements set forth in this Declaration shall affect each and all of the lots delineated on said Map, shall run with the land and shall exist and be binding until the first day of March, 1985, when they shall in all respects terminate and be of no further effect, unless prior to said March 1985, the owners of record of seventy-five percent (75%) of the lots in said subdivision shall by written instrument, duly executed and recorded in the same manner as grants of real property, declare a continuation or modification of the same, in which event same shall continue for a further period of time and in such manner as in such declaration provided. The restrictions referring to persons who are not of the white or Caucasian race shall be perpetual.

SECTION 2. All of the said restrictions, conditions covenants, provisions and agreements are made for the mutual and reciprocal benefit of each and every lot shown on said map, and are intended to create mutual equitable servitudes upon each of said lots in favor of every other lot shown on said map, to create reciprocal rights between the respective owners of all of the lots shown on said map,

FIG. 6 upon each and every parcel of said property as a servitude in favor of each and every parcel thereof as the dominant tenement or tenements, as fellows, to wit.

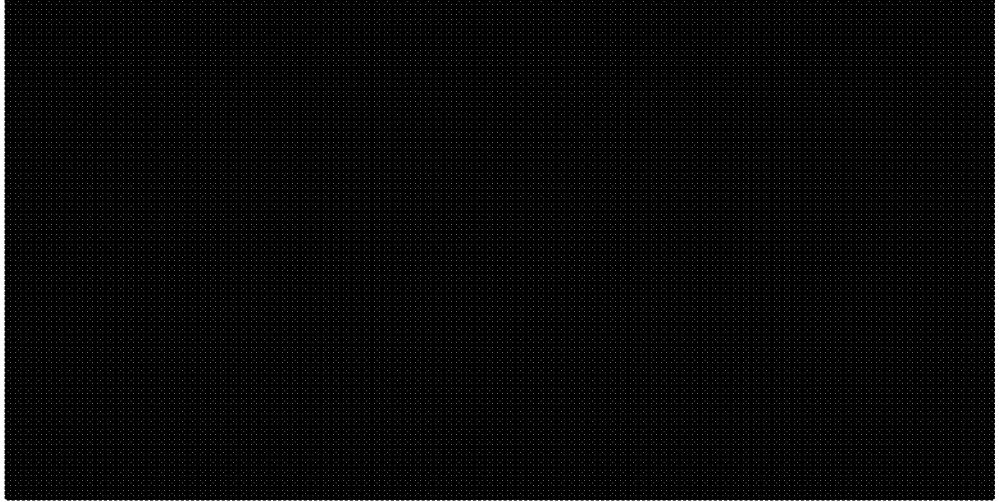

SECTION 2. All of the said restrictions, conditions covenants, provisions and agreements are made for the mutual and reciprocal benefit of each and every lot shown on said map, and are intended to create mutual equitable servitudes upon each of said lots in favor of every other lot shown on said map, to create reciprocal rights between the respective owners of all of the lots shown on said map,

EL DORADO COUNTY

3- No person of African or Mongolian descent, or any person other than of the Caucasian Race shall use, or occupy (except when employed as domestic help by the owner or occupant) said premises or any part thereof.

4- No alcoholic, vinous, malt or intoxicating liquor of any kind shall ever be manufactured, sold, given away, or exposed for sale, or disposed of, as a beverage in any place of public resort upon the said premises or any part thereof.

5- This deed is made and accepted upon the further express condition that plans and specifications for any building to be erected on the premises shall, prior to commencement of construction thereof, receive the approval in writing of the Grantors, or their successors in interest, and provided further that no building shall be erected closer than ten (10) feet to any side property line, and that there shall be installed and maintained with building erected on the premises an approved type of septic tank for the disposal of sewage.

6- Each dwelling, with customary outbuildings, erected or maintained on the premises must be on a plot of land having an average width of not less than 80 feet and with a road frontage of not less than 50 feet.

7- No horses or other animals, except dogs or cats, shall be housed or kept on the premises.

A breach of any one or more of the said conditions shall render this deed void and the premises described herein shall thereupon, without notice or entry, revert to the Grantors, or their successors in interest, without any compensation being made or agreed to be paid to the Grantees, or their successors in interest, or obligation of any kind thereto.

There is no taxable consideration being transferred.

FIG. 15

AI-BASED DETECTION OF CONTEXTUAL CLASS DESCRIPTION IN DOCUMENT IMAGES

BACKGROUND

The identification of the description of a certain class in a particular context in unstructured document images can be a challenging technical problem. In addition to containing unstructured text, some document images may be of poor quality (e.g., low resolution scan), have varied contrast, have varied orientation, and/or contain handwritten text. For example, the state of California has recently mandated that organizations identify and flag real estate document images containing language that discriminates against a class of people. However, developing a technical framework for complying with this mandate may be a challenging technical problem. In some cases, real estate document image repositories may include scans of millions of real estate document images dating back to the early 1900s or even earlier. Depending on the quality/resolution of the original document, the date of the scan, and the scanning technology used, some of these document images may be of poor quality.

SUMMARY

Some implementations of the disclosure describe techniques for utilizing multiple vision-based models predict a particular contextual use of a term in a document image in a fast and efficient way.

In one embodiment, a non-transitory computer-readable medium has executable instructions stored thereon that, when executed by a processor, cause the processor to perform operations comprising: obtaining a document image file including a first image corresponding to a first page of a document; generating, using a first trained model, based on the first image, a first prediction that the first page includes a term identifying a class of people, the first prediction including a first location of the term within the first image; and in response to generating the first prediction that the first page includes the term identifying the class of people, generating, using a second trained model, based on the first image, a second prediction of whether or not the first page includes a section that uses a term identifying a class of people in a specific context.

In some implementations, the second prediction is that the first page includes the section that uses the term identifying the class of people in the specific context; and the second prediction comprises a second location of the section.

In some implementations, the operations further comprise: in response to the second prediction being that the first page includes the section that uses the term identifying the class of people in the specific context, redacting, based on the second location of the section, the section within the first image.

In some implementations, the operations further comprise: in response to the second prediction being that the first page includes the section that uses the term identifying the class of people in the specific context, storing the second location and a page number of the first page in a datastore.

In some implementations, the first prediction further comprises a first confidence score; the second prediction further comprises a second confidence score; and the operations further comprise: storing the first location, the first confidence score, and the second confidence score in the datastore.

In some implementations, the operations further comprise: redacting, based on the second location of the section, the section within the first image. In some implementations, the specific context is a discriminatory context.

In some implementations, the document refers to a real property; the class of people corresponding to the term used in the section comprises a race, color, religion, national origin, sex, or sexual orientation; and the section includes text restricting, based on race, color, religion, national origin, sex, or sexual orientation, the sale, use, lease, rent, or occupancy of the real property.

In some implementations, the first prediction further includes a label corresponding to the term identifying the class of people; and the operations further comprise: determining that the first location is within the second location; and in response to determining that the first location is within the second location, associating the label with the section.

In some implementations, the operations further comprise: determining that the first location is not within the second location; and in response to determining that the first location is not within the second location, presenting a graphical user interface for a user to review the section.

In some implementations, the document image file includes a second image of a second page of the document; and the operations further comprise: generating, using the first trained model, based on the second image, a third prediction that the second page does not include any terms identifying classes of people; and in response to generating the third prediction, not using the second trained model to generate any predictions about the second page.

In some implementations, the first trained model is a first object detection model and the second trained model is a second object detection model.

In some implementations, the operations further comprise generating the first trained model by: obtaining multiple textual data representations of multiple document image files; identifying, using at least regular expression-based rules, and the multiple textual data representations, multiple text strings within the multiple textual data representations that identify classes of people; determining a location of each of the multiple text strings within the multiple document image files; and training, based on the multiple document image files and the locations of the multiple text strings, a model as the second trained model.

In some implementations, generating the first trained model further includes: transforming the multiple document image files to obtain multiple transformed versions of the document image files; determining a location of each of the multiple text strings within the multiple transformed versions of the document image files; and training, based on the multiple transformed versions of the document image files and the locations of the multiple text strings within the transformed versions of the document files, the model as the second trained model.

In one embodiment, a method comprises: obtaining, at a computing device, a document image file including a first image corresponding to a first page of a document; generating, at the computing device, using a first trained model, based on the first image, a first prediction that the first page includes a term identifying a class of people, the first prediction including a first location of the term within the first image; in response to generating the first prediction that the first page includes the term identifying the class of people, generating, at the computing device, using a second trained model, based on the first image, a second prediction of whether or not the first page includes a section that uses a term identifying a class of people in a specific context.

In one embodiment, a system comprises: a processor; and a non-transitory computer-readable medium having executable instructions stored thereon that, when executed by the processor, cause the processor to perform operations comprising: obtaining a document image file including a first image corresponding to a first page of a document; generating, using a first trained model, based on the first image, a first prediction that the first page includes a term identifying a class of people, the first prediction including a first location of the term within the first image; and in response to generating the first prediction that the first page includes the term identifying the class of people, generating, using a second trained model, based on the first image, a second prediction of whether or not the first page includes a section that uses a term identifying a class of people in a specific context.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations.

FIG. 2B illustrates an example location with a document image file containing a term identifying a class of people that was found using a class detection model, in accordance with some implementations of the disclosure.

FIG. 2C depicts four examples of terms that identify a class of people that were found using a class detection model, in accordance with some implementations of the disclosure.

FIG. 3A depicts an example location within a document image file containing a section including text that discriminates against a class of people that was found using a class discriminatory section detection model, in accordance with some implementations of the disclosure.

FIG. 3B depicts an example location within a document image file containing a section including text that discriminates against a class of people that was found using a class discriminatory section detection model, in accordance with some implementations of the disclosure.

FIG. 3C depicts an example location within a document image file containing a section including text that discriminates against a class of people that was found using a class discriminatory section detection model, in accordance with some implementations of the disclosure.

FIG. 4 depicts an example document image that may be input into the workflow of FIG. 1.

FIG. 5 depicts the location of a term identifying a class of people predicted within the document image of FIG. 4 using a class detection model, in accordance with some implementations of the disclosure.

FIG. 6 depicts the location of a section including text that discriminates against a class of people predicted within the document image of FIG. 4 using a class discriminatory section detection model, in accordance with some implementations of the disclosure.

FIG. 7 is an example showing the document of FIG. 4 after redacting the section identified in FIG. 6.

FIG. 9 shows two occurrences of class terms that were identified within a training document image by automatically parsing an OCR'd file corresponding to the training document image, in accordance with some implementations of the disclosure.

FIG. 10B illustrates an additional example of a location within a document image containing a term identifying a class of people that was found using a class detection model trained, in accordance with some implementations of the disclosure.

FIG. 12A illustrates an additional example of a location within a document image containing a section including text that discriminates against a class of people that was found using a class discriminatory section detection model trained in accordance with some implementations of the disclosure.

FIG. 12C illustrates an additional example of a location within a document image containing a section including text that discriminates against a class of people that was found using a class discriminatory section detection model trained in accordance with some implementations of the disclosure.

FIG. 15 depicts examples of three locations within a document image containing three terms identifying a class of people that were found using a class detection model, and one location containing a section including text that discriminates against a class of people that was found using a class discriminatory section detection model, in accordance with some with some implementations of the disclosure.

Figure 1:
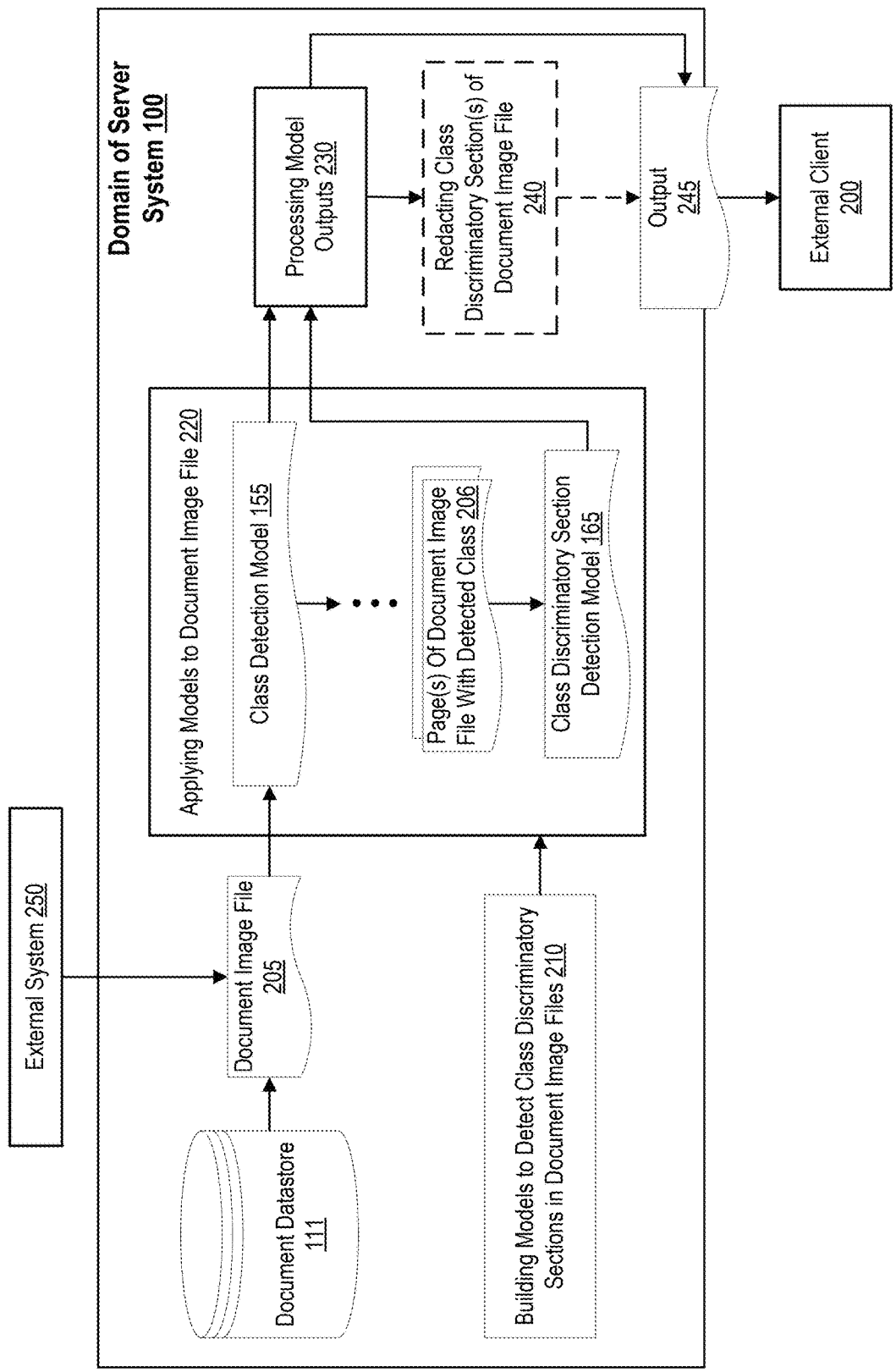
FIG. 1 depicts a flow diagram illustrating a method showing the general operation of a server system, in accordance with some implementations of the disclosure.

The figures are not exhaustive and do not limit the present disclosure to the precise form disclosed.

DETAILED DESCRIPTION

A traditional approach for identifying patterns of information in scanned documents relies on using optical character recognition (OCR) and a rules-based element matching such as regular expression (regex) to identify information patterns. The problem with such approaches is that they are sometimes computationally inefficient, misidentify data elements in poorly scanned documents as containing or not containing an information pattern, are sometimes cost inefficient, and may not be particularly suited to identifying the contextual use of a term in an unstructured document.

For example, as discussed above, real estate document image repositories may include scans of real estate document images that are of poor quality, even being difficult for a human to read or not being human readable. OCR engines or natural language models (NLP) may often fail to correctly recognize text in such scenarios. For example, the OCR engines can fail to correctly recognize blurry text, low resolution text, words having missing or misaligned characters, split page scans, etc. As such, reliance on OCR engines can result in many true positives being missed. Additionally, building rules using regular expressions may not scale in scenarios involving a wide range of images taken from different document types. For example, the combination of OCR engines and regular expressions may not be suitable for quickly processing many millions of images a real estate document image repository having a range of different document images from different states and counties, and having different levels of quality.

The systems and methods described herein utilize a combination of multiple vision-based models (e.g., object detection models) to predict a particular contextual use (e.g., discriminatory use) of a term (e.g., term identifying a class of people) in a document image in a fast and efficient way relative to some existing techniques. As further described herein, a first trained model is configured to predict, based on features of an input document image, the presence (or absence) of a class (e.g., a class of people). If the class is found, a second trained model is applied to the input document image to predict whether or not the document image contains a section (e.g., paragraph or sentence) that describes a class in a particular context (e.g., a section that discriminates against a class of people).

The systems and methods described may improve the computational performance, cost efficiency, and/or accuracy (e.g., specificity) in an application for identifying the context (e.g., discriminatory) in which a class (e.g., class of people) is described in a document image. In particular, the two-stage model approach may provide several benefits. For example, by virtue of using a first, less computationally demanding model, as a first filter that is trained to predict the presence of particular terms (e.g., classes of people) in document images, and applying the second trained model only to pages positively identified by the first trained model as containing such terms, the techniques described herein may improve system runtime performance and cost per document page. Additionally, by virtue of applying a second trained model that is trained to identify a particular context (e.g., discriminatory) in which the term is used, false positives identified by the first trained model may be reduced, and only sections describing the class in the particular context (e.g., discriminatory) are identified.

FIG. 1 depicts a flow diagram illustrating a method showing the general operation of a server system 100, in accordance with some implementations of the disclosure. Although FIG. 1 and other embodiments of the disclosure will be primarily described in the context of predicting the presence in a document image of a section that discriminates against a class of people, the systems and methods described herein may more generally be applied to predicting the presence of a section in a document image that describes any type of class (e.g., class of person, class of object, etc.) in a particular context.

Operation 210 includes building models for detecting class discriminatory sections in document image files. As depicted in this example, a class detection model 155 and a class discriminatory section detection model 165 are built. These models may be vision-based models that do not rely on OCR to identify elements. Each model may employ a neural network that is good at object detection, and it may be tuned to detect a particular pattern of information and localize it (e.g., with coordinates) on a given page or image. Particular methods for building such models are further described below.

Figure 2A:
FIG. 2A illustrates an example location with a document image file containing a term identifying a class of people that was found using a class detection model, in accordance with some implementations of the disclosure.

As described herein, a class detection model 155 is configured to identify a location within a document image that contains a term identifying a class of people. In instances where multiple such terms appear in an image, the model may be configured to identify the location of each term within the image. The term identifying the class of people may refer to a race (e.g., "Caucasian", "Chinese" "Mexican", "Japanese"), a religion (e.g., "Hindu", "Hebrew", "Christian", "Muslim", "Catholic", etc.), a skin color (e.g., "white", "black", "brown", "negro", etc.), an origin (e.g., "Asian", "African", "Middle Eastern", "European", etc.), a sex, a gender, a gender identity, a sexual orientation, a marital status, a gender expression, veteran or military status, familial status, source of income, and the like. FIGS. 2A and 2B illustrate two examples of locations within document image files containing a term identifying a class of people that were found using a class detection model 155, in accordance with some implementations of the disclosure. In these two examples, the class detection model 155 identifies the boundaries of a location containing the term "Caucasian race". As also depicted in the example of FIG. 2B, the class detection model 155 may output a label indicative of the identified class. For example, labels such as "race", "religion", "color", "sex", "origin", "gender", and the like may be output by the model. In such cases, the class detection model 155 may be configured as an objection detection model that generates a prediction including a location of an identified class of people within a document image, and a label indicative of the identified class. FIG. 2C depicts four additional examples of terms that identify a class (e.g., race or origin) of people that were found using a class detection model 155, in accordance with some implementations of the disclosure. As further described herein, the class detection model 155 may serve as a first-level detector or filter that identifies documents images potentially containing class discriminatory sections.

Figure 3A:
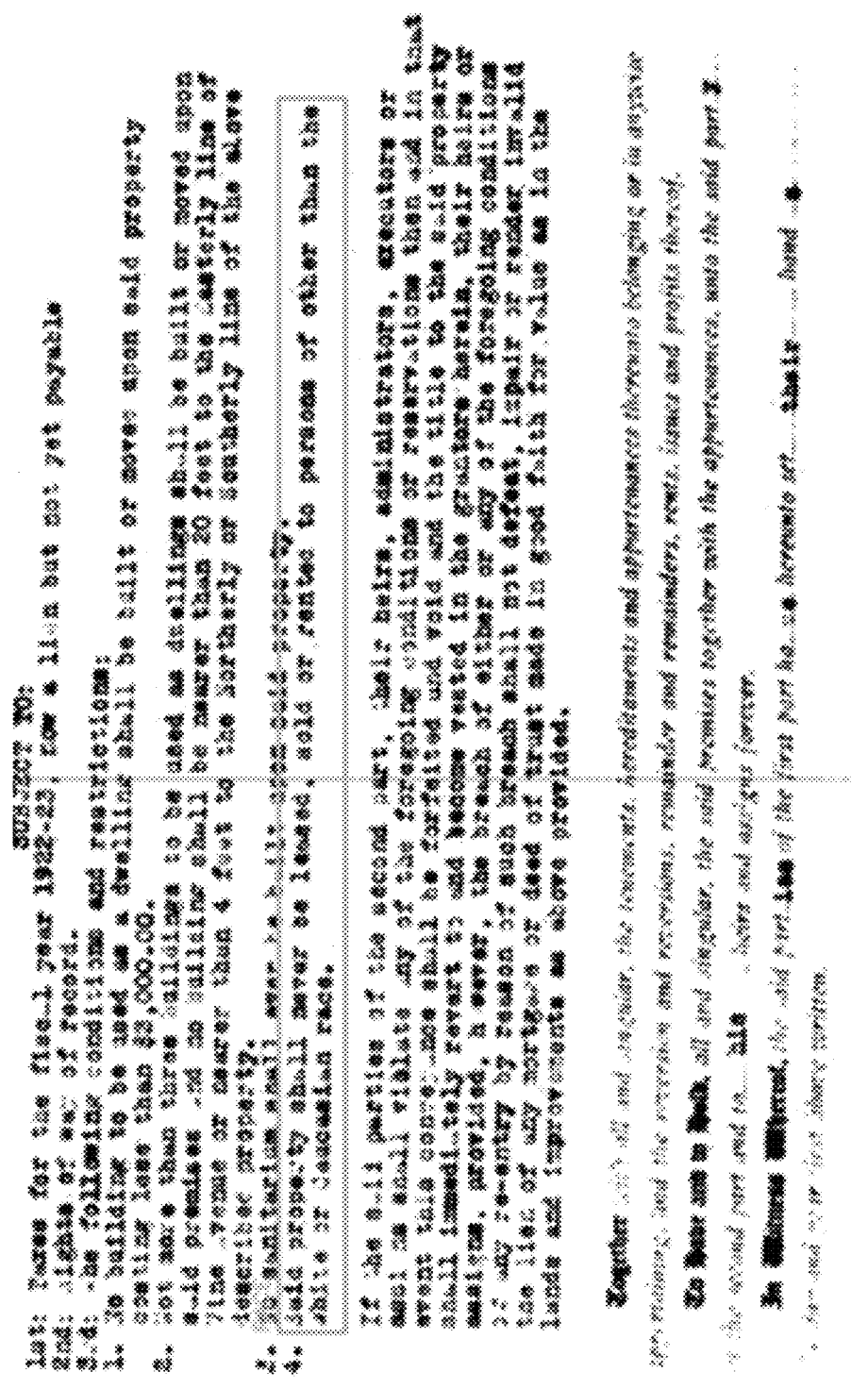
Figure 3B:
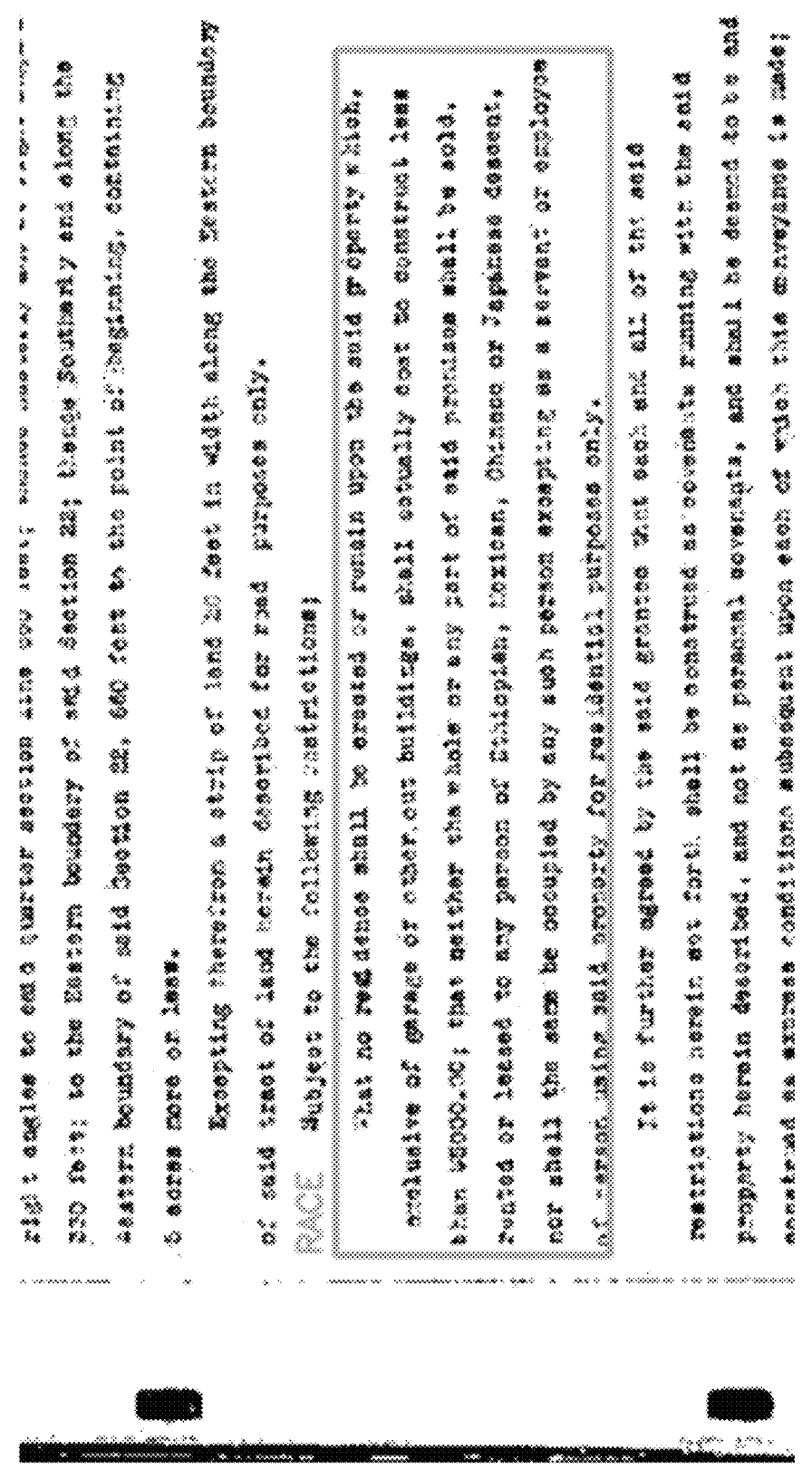
Figure 3D:
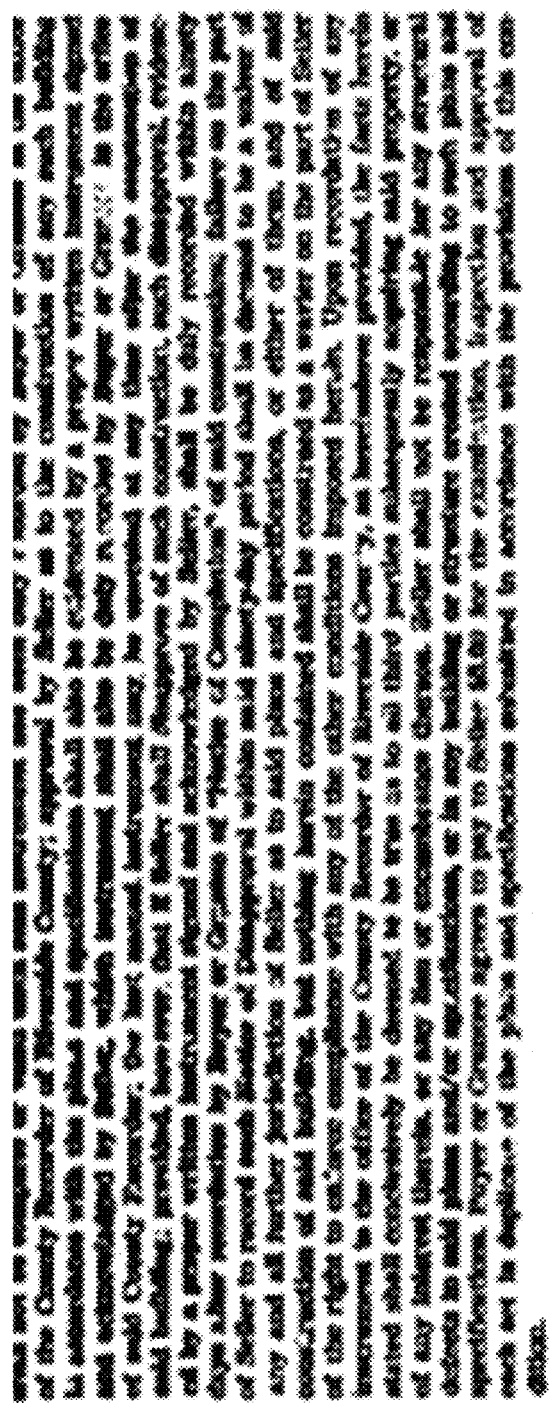
FIG. 3D depicts example locations within a document image file containing sections including text that discriminates against a class of people that were found using a class discriminatory section detection model, in accordance with some implementations of the disclosure.

As described herein, a class discriminatory section detection model 165 is configured to identify a location within a document image that contains a section including text that i) identifies a class of people; and ii) discriminates against the class of people. In instances where multiple such sections appear in an image, the model may be configured to identify the location of each section within the image. The section may be a sentence, a paragraph (e.g., a paragraph containing one or more sentences), or some other group of words that identify and discriminate against a class of people. In the real estate context, the section may be a section of a document (e.g., deed) that relates to a real property and contains a provision that attempts to forbid, restrict, or condition the right of any person or persons to sell, buy, lease, rent, use, or occupy the real property on account of their class. For example, the section may be a restrictive covenant that restricts the sale, lease, rent, occupation, or use of real property to a particular class of people. FIGS. 3A-3D illustrate four examples of locations within document image files containing sections including text that discriminates a class of people that were found using a discriminatory section detection model 165, in accordance with some implementations of the disclosure. In the example of each of FIGS. 3A-3C a location of a paragraph that discriminates on the basis of race was found. In the example of FIG. 3D, the locations of two paragraphs that discriminate on the basis of race were found.

Although server system 100 is depicted in the example of FIG. 1 as both building and applying the models, separate systems may be utilized to create and apply the models.

After the models are built, they may be applied as part of an application or workflow that detects locations of discriminatory sections in a new document image file 205 (operations 220-230), and, optionally, redacts the detected sections (operation 240). This workflow may be performed in response to a processing request from an external client 200 for one or more documents. For example, an application run by an external client 200 may initiate a request for a document image file 205 stored at a document datastore 111 of server system 100. Alternatively, the workflow may be automatically performed by server system 100. For example, the workflow may be performed on existing document image files stored in a document image file repository of server system 100, or in response to ingesting a new document image file 205 or batch of document files from an external system 250.

For ease of illustration, the workflow for detecting and redacting discriminatory sections (operations 220-240) in an obtained document image file 205 is described with reference to FIGS. 4-7, which depict an example document image file 205 at various stages of the workflow. FIG. 4 depicts an example document image file 205 input into the workflow. The unredacted image in this example is a declaration relating to real property. The declaration includes a section (Section 1) that places additional restrictions based on a class of people.

Operation 220 includes applying the models to the document image file 205. In some implementations, prior to applying the models, the image may be preprocessed. Preprocessing may normalize the image so that the results of applying the models to different document images is more consistent. For example, the image may be rotated, denoised, and/or deblurred. In some implementations, the brightness and/or contrast of the image may be changed during pre-processing.

Referring to the example of FIG. 5, the document image file 205 is input into a class detection model 155 that outputs predictions of one or more image locations corresponding to terms identifying a class of people. In the example of FIG. 5, the model 155 predicts one such image location including the term "Caucasian race". Each of the image locations predicted by model 155 may be in the form of coordinates identifying boundaries of the image location. For example, where the class detection model detects locations as bounding boxes, the bounding box may be defined by a set of four coordinates (e.g., x_min, y_min, x_max, y_max) within the image. Particular methods for training class detection model 155 to detect such terms are further described below. In addition to predicting the locations, the class detection model 155 may output a confidence score associated with each prediction. The confidence score may be expressed as a percentage (e.g., 70%, 80%, 90%, 100%, etc.), a number from 0 to 1 (e.g., 0.7, 0.8, 0.9, 1, etc.), or another format. In some implementations, the prediction output by class detection model 155 may also include a label corresponding to the identified class. For example, for the location including the term "Caucasian race", the model may output the class label "race" in addition to pixel coordinates of the location of that term and a confidence score (e.g., "95%").

The class detection model 155 may be applied to each page/image of document image file 205 to determine pages/images 206 (if any) of the document image file having a detected class. For example, the server system 100 may update a database or table with an entry that flags each page of the document image file as predicted to contain or not contain at least one instance of a class. If a given page is predicted by the model 155 to have one instance of a class with a threshold accuracy (e.g., a confidence score output by the model exceeds some threshold), such page may be flagged by the server system 100. In the example workflow of FIG. 1, only pages 206 that are flagged as containing an instance of a class are input into the class discriminatory section model 165.

For a given page/image 206, the class discriminatory detection model 165 outputs predictions of locations within the document image that contain a section including text that i) identifies a class of people; and ii) the identification is within a context of interest (e.g., a context that discriminates against the class of people). In the example of FIG. 6, one such image location is predicted by model 165, which includes the paragraph corresponding to "SECTION 1". Each of the image locations predicted by model 165 may be in the form of coordinates identifying boundaries of the image location (e.g., a bounding box defined by four coordinates). Particular methods for training class discriminatory detection model 165 to detect such image sections are further described below. In addition to predicting the locations, the class discriminatory detection model 165 may output a confidence score associated with each prediction.

By virtue of using the aforementioned two-stage approach for predicting discriminatory sections of document images in which model 155 is used to identify pages 206 of a document file 205 that potentially contain terms identifying a class of people, and model 165 is applied only to pages 206, system runtime performance and accuracy may be improved. While model 165 may more accurately identify instances of discriminatory document sections, it may be more computationally expensive to run due to it being trained to identify locations of text containing a class and context (e.g., discriminatory). This two-stage approach may be particularly advantageous, for example, in applications in which many millions, if not billions, of document image pages need to be reviewed. Class detection model 155 is initially applied to detect all potential instances of discriminatory sections in document images by identifying pages containing terms referring to a class. This may improve system runtime performance as contrasted with running a model 165 on every page of the document image file 205. Class discriminatory section detection model 165 is subsequently applied to the subset of pages identified using class detection model 155, reducing any false positive identifications made by model 155, and improving system accuracy (e.g., specificity).

Following application of the models, operation 230 includes processing the model outputs to generate output 245. As discussed above, class detection model 155 may generate the following prediction for a given page: coordinates of term(s) identifying classes (if any), confidence score associated with each predicted set of coordinates, and a label associated with each prediction. Discriminatory paragraph detection model 165 may generate the following prediction for a given page: coordinates of section(s) that discriminates against class (if any), confidence score associated with each predicted set of coordinates, and a label associated with each prediction. Alternatively, model 165 may not generate a label associated with each prediction of a section. Instead, a label generated by model 155 for a term may be associated with a section predicted by model 165 if, for example, the bounding box defined by the coordinates of the term is within the bounding box defined by the coordinates of the section. For example, an identified discriminatory section may be associated with the label "race" or "religion".

The model outputs may be combined and/or formatted as metadata that is stored in a table, array, or other suitable data structure. The model predictions may be provided on a per page/per image basis as output 245. For example, the system may store metadata associating the following information with each page of a document image file identified as containing a discriminatory section: page number, coordinates of each discriminatory section identified on page, and, optionally, the confidence score of model 165 associated with each prediction. The system may optionally also store metadata associated with the predictions by model 155. For example, the system may store metadata associating the following information with each page of a document image file: coordinates of each class identified on page by model 155, and confidence score associated with each prediction of model 155. In some implementations, the system may also store metadata corresponding to the label output by model 155 and/or model 165.

To illustrate one particular example of the model outputs that may be stored in a database for a given document image file, consider FIG. 15, which depicts examples of three locations within a document image containing three terms identifying a class of people that were found using a class detection model 155, and one location containing a section including text that discriminates against a class of people that was found using a class discriminatory section detection model 165, in accordance with some with some implementations of the disclosure. The depicted image is of dimension 468 pixels×451 pixels. Model 155 has identified three objects ("African", "Mongolian", "Caucasian Race") and model 165 has identified one section/paragraph. The data that may be stored in the database in this example may be as depicted by Table 1, below, with (left, top) denoting the (x, y) coordinates of the top left corner of a bounding box and (right, bottom) denoting the (x, y) coordinates of the bottom right corner.

TABLE 1

| doc_id, page, class, left, top, right, bottom, confidence_score |
|---|
| 1953441, 4, RACE_AFRICAN, 175, 108, 217, 117, 0.8232 |
| 1953441, 4, NATIONALITY_ETHIOPIAN, 237, 108, 288, 118, 0.7856 |
| 1953441, 4, RACE_CAUCASIAN, 227, 118, 305, 128, 0.9231 |
| 1953441, 4, RC_PARA, 102, 106, 405, 149, 0.9041 |

In this example, the origin (0, 0) is on the top left corner of the image, and the Y axis is positive downward and increases going down. The first three rows may be generated based on the output by model 155 and the last row may be generated based on the output of model 165.

In some implementations, the model outputs may also be processed in a post processing pipeline that generates metrics or statistics relating to the processed images. For example, the following metrics may be obtained from post processing the model outputs: average discriminatory term count per page drill down by state/county/page/coordinates, average discriminatory paragraph count per page drill down by state/county/page/coordinates, runtime per page for each detection, and/or cost per page for each detection. The generated metrics may be stored in a repository. In some cases, the generated metrics may inform additional training or retraining of the models.

Optional operation 240 includes redacting the class discriminatory section(s) of the document image file. The document image file may be redacted in preparation for transmitting a copy (e.g., as output 245) to an external client 200, or to maintain a local redacted version. The document image file may be redacted based on the identified locations of class discriminatory sections. For example, given the coordinates identifying a location within an image, that pixels of that portion of the image may modified. For example, the portion of the image may be modified by blacking it out, whiting it out, or replacing it. FIG. 7 is an example showing the document of FIG. 4 after performing operation 240. As depicted in this example, the "Section 1" section of the image containing the discriminatory text is blacked out.

In some implementations, both the redacted document image file and metadata associated with the identified discriminatory sections (e.g., page numbers, coordinate locations, confidence scores) are made available to an external client 200. In some implementations, only one of the redacted document image file or metadata are made available As noted above, one of the technical challenges that may be present in building a class detection model 155 is that many of the document images for which class predictions are made are of poor quality. For example, real estate document image repositories may include scans of real estate document images dating back to the early 1900s or even earlier. Depending on the quality/resolution of the original document, the date of the scan, and the scanning technology used, some of these document images may be of poor quality. As such, the class detection model 155 may need to be trained to identify classes in documents having poor textual quality, inconsistent orientation, character misalignments, double page scans, poor contrast, and/or other issues.

Figure 8:
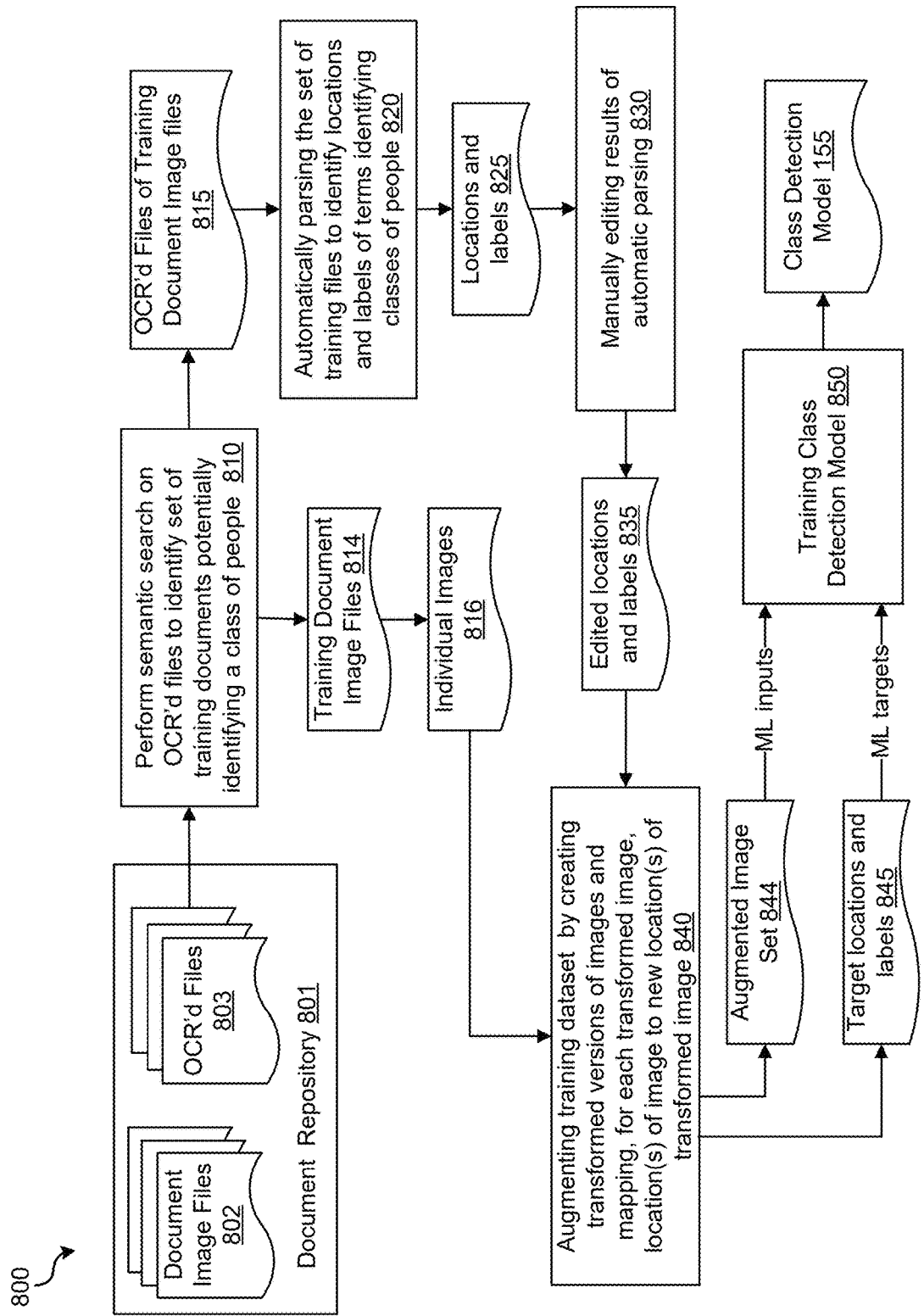
FIG. 8 is an operational flow diagram illustrating an example method of building a class detection model from a document repository including unlabeled document image files, in accordance with some implementations of the disclosure.

FIG. 8 is an operational flow diagram illustrating an example method 800 of building a class detection model 155 from a document repository 801 including unlabeled document image files 802, in accordance with some implementations of the disclosure.

The document image files 802 may include thousands, millions, or even billions of documents stored in a document image format (e.g., png, tiff, pdf, etc.). For example, in implementations where server system 100 is utilized by a real estate organization such as an organization that provides title insurance and/or settlement services, these documents may comprise covenants, deeds such as warranty deeds or deeds of trust, and various other documents relating to parcels of real property from different states and counties, especially those potentially containing discriminatory paragraphs as discussed above. To illustrate, the document image files 802 may include: county recorded document images from all U.S. states, deed documents, affidavits, HOA documents, cemetery documents, country club documents, real property mortgage documents, mortgage statutory form, declarations, real estate contracts, and the like. As such, the document images may include a combination of documents images containing unstructured text (e.g., deed of trust), document images containing semi structured text (e.g., cemetery documents), and structured document images (e.g., death certificates).

Prior to building the class detection model 155, OCR is performed on each of the document image files to obtain OCR'd files 803. In this example, the document repository 801 already stores the OCR'd files 803. However, in other implementations, the OCR'ed files 803 may need to be obtained. In some implementations, the OCR'd document files 803 may be in an Extensible Markup Language (XML) or JavaScript Object Notation (JSON) format. The document image files 802 may be converted to the OCR'd files 803 using any suitable OCR engine (e.g., any OCR engine capable of converting PDF/TIFF files to XML/JSON files). In some implementations, multiple OCR engines may be used. As different OCR engines may interpret images differently, and different OCR engines may specialize with different types of documents, an OCR engine most suitable for a certain type of document may be used to OCR the document.

Operation 810 includes performing a semantic search on the OCR'd files 803 to identify a set of training documents potentially identifying a class of people. The semantic search may function as a binary search that indicates the presence of some type of class of people (e.g., a restricted class as defined by law) in an OCR'd file 803. Three examples of search criteria that may be used for the semantic search include: doc_full_text: "Ethiopian, Malay"); (doc_full_text: "person of African"); and (doc_full_text: "person of Oriental"). If one or more of the search criteria are present in a OCR'd file, the document image file 802 corresponding to the OCR'd file may be identified as a training document image file 814, and the OCR'd file may be identified as an OCR'd file 815 of a training document image file 814. It should be appreciated that any number of suitable criteria, including tens or hundreds of criteria may be utilized. The use of the semantic search may be particularly advantageous in embodiments where a training set needs to prepared for many millions, if not billions, of document image files 802, especially when the majority of documents do not identify a class. For example, it may be possible to reduce an initial set of hundreds of millions of document image files 802 to thousands of training document image files 814. In some implementations, the semantic search may be skipped, and all document image files 802 are used during training.

In some implementations, metadata associated with the set of training document image files 814 that were identified may be stored in a training database that may include one or more tables. For example, image metadata that may be stored may include an image path in an image repository storage location, a unique identifier of the image, and a flag signaling that a class term was found. By way of illustration, Table 2 shows an example of metadata that may be stored for each image of the training document image files 815.

TABLE 2

| Column Name in Training Database | Value Examples |
| --- | --- |
| Image Path | Image Repository location |
| Image Unique Identifier | 2020-10-15_02-33-32-am_87d15c283t7c43zf85e1t61be9152b9d |
| Class Term Found Flag | Y |

Figure 9:
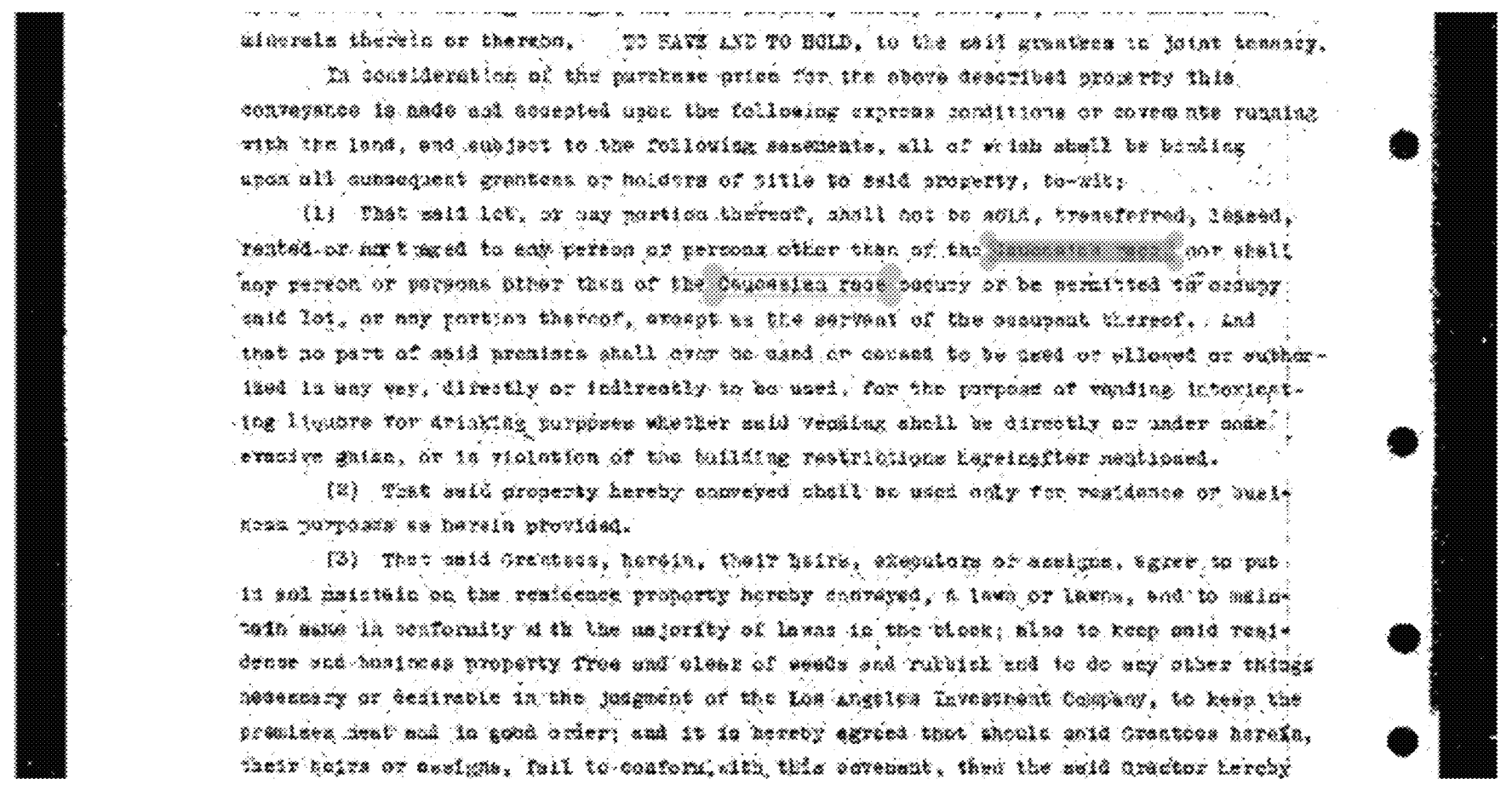

Operation 820 includes automatically parsing the OCR'd files 815 corresponding to the set of training document image files 814 to identify locations (e.g., bounding box coordinates) and labels 825 of terms identifying classes of people. For example, class labels may include "RACE-CAUCASIAN", "COLOR-BLACK", "NATIONALITY-Ethiopian", "RELIGION-HEBREW", and the like. By way of example, FIG. 9 shows two occurrences of the "CLASS-CAUCASIAN" that were identified within a training document image by automatically parsing an OCR'd file corresponding to the training document image, in accordance with some implementations of the disclosure. In this example the two occurrences of the class may be stored in the training database.

A parser implementing regex rules adapted to find class terms may detect them within the OCR'd files 815. For a given page, the parser may search through all words on the page and identify every instance of terms identifying a class of people. For each class term identified on a given page, the parser may return its location along with the label identifying the class term. The location returned by the parser may be mapped to pixel coordinates in a page of the training document image file 814 corresponding to the OCR'd file 815 that was parsed. In some instances multiple different classes may be identified in a single page. The parser may map to pixel coordinates through the use of an OCR engine that identifies bounding box coordinates of OCRed text. Metadata associated with identified classes, including a label, associated page number, and bounding box coordinates may be stored in the training database. Continuing the above example, Table 3 shows an example of metadata that may be stored for an identified class in a training database.

TABLE 3

| Column Name in Training Database | Value Examples |
| --- | --- |
| Image Path | Image Repository location |
| Image Unique Identifier | 2020-10-15_02-33-32-am_87d15c283t7c43zf85e1t61be9152b9d |
| Class Term Found Flag | Y |
| Class | RACE-CAUCASIAN |
| Page Number | 3 |
| Bounding Box Coordinates | 0.78588, 0.425909, 0.232941, 0.030000 |

To enable manual editing of the results of automatically parsing the OCR'd files 815 corresponding to the set of training document image files 814 and subsequent operations of method 800, the pages of each of the training document files 814 may be need to converted to individual images 816. For example, a PDF of multiple pages images may converted into multiple PNG files, each PNG file corresponding to a page. In some implementations, individual page images may already be stored in document repository 801. In such implementations, the individual page images may be retrieved from repository 801 after identifying the document image files 814.

Operation 830 includes manually editing the results (locations and labels 825 of terms identifying classes of people) of automatically parsing the OCR'd 815 files to obtain edited locations and labels 835 of terms identifying classes of people. For example, the system may present a graphical user interface (GUI) to the user that displays, for each individual image/page 816, any identified locations and labels. An identified location (e.g., pixel coordinates) may be displayed on its corresponding image 816 as a bounding box in the image. The GUI may include one or more controls or tools for labeling missed class terms and/or adjusting misaligned bounding boxes. In response to presenting the GUI, the system may receive data corresponding to user input tagging any locations within the image that contain identifications of classes of people the automatic process missed. For example, the user may draw new bounding boxes and add corresponding labels. Additionally, the system may receive documents that were exclusively hand labeled with locations of terms. Such documents may be uploaded by the user. To fix errors such as the identified location not bounding an entire term, or bounding too much data, the GUI may display the bounding boxes around the identified term, and the user may adjust the size and areas covered by the bounding boxes. The user may also modify any tags/labels associated with each of the bounding boxes.

One advantage of using a parser implementing regex rules to automatically detect locations in a first pass through is that the process of building the model can be sped up. Instead of hand labeling all images for training, regex rules may be used to automatically to find locations. Subsequently, hand editing and labeling may be relied upon as a mechanism to fix any errors of the automated process. This technique enables training on a substantially larger dataset, which can improve the predictive capability of the model that is developed.

Continuing the above example, Table 4 shows an example of metadata that may be stored in a training database after human identification of a new class term.

Operation 840 includes augmenting the training dataset by creating transformed versions of individual images 816 and mapping, for each transformed version, the location(s) of any classes identified in the image to new location(s) in the transformed image. As shown, the output of operation 840 includes an augmented image set 844 and target locations and labels 845. The augmented image set 844 may include all original images 816 and their transformed versions. The target locations and labels 845 may include the locations and labels associated with the images of augmented image set 844.

When training an object detection model to recognize terms in poor quality images, it can be important to augment the number of images in the dataset to include images having a variety of potential deficiencies that could be encountered during application of the model. In this manner, the predictive capability of the model can be improved. To this end, image dataset augmentation may be based on variety of criteria, including, for example, poor quality, rotation, and/or misalignments. In some implementations, an image 816 may be transformed by applying one or more of the following transformations to the image: shifting the image (e.g., by rotating the image between 1-5 degrees from its center), adding noise to the image, blurring the image, changing the brightness of the image (e.g., randomly, setting to low brightness, or setting to high brightness), changing the hue of the image, or changing the saturation of the image. One or multiple transformed images may be generated for a given image 816. For example, in addition to having the original image 816, the training dataset may add a rotated version of the image, a blurred and noised version of the image, a version of the image with hue and saturation set to high levels, etc. In some implementations, five transformed images, ten transformed images, or even more transformed images may be generated.

In at least some transformed images, it may be necessary to map the location (e.g., bounding box coordinates) of an original image to a new location (e.g., bounding box coordinates) of a transformed image. For example, for noise-based transformation, a suitable algorithm may be used to map to the new location. As another example, for rotated images, the mapping may be determined by calculating the distance of the original, non-augmented image's bounding box from the center and using a rotation matrix calculation (e.g., by applying the rotation matrix to the original coordinates). The new bounding box height and width may then be adjusted by a factor based on the original image's height and width. In some implementations, this calculation is applied to images rotated between about 1 and 5 degrees.

In some transformed images, it may not be necessary to map the location (e.g., it does not change). In some imple-

TABLE 4

| Column Name in Training Database | Value Examples |
| --- | --- |
| Image Path | Image Repository location |
| Image Unique Identifier | 2020-10-15_02-33-32-am_87d15c283t7c43zf85e1t61be9152b9d |
| Class Term Found Flag | Y |
| Class | RACE-CAUCASIAN |
| Page Number | 3 |
| Bounding Box Coordinates | 0.78588, 0.425909, 0.232941, 0.030000 |
| Validated Manually | Y |
| Labeled Manually | Y |
| User | Jdoe |
| Additional Class (Human Identified) | COLOR-BLACK |
| Bounding Box Coordinates of New Class | 0.88588, 0.525909, 0.532941, 0.130000 | mentations, the mapped locations for transformed images may be manually reviewed (e.g., via random sampling), and they may be adjusted as needed. In such implementations, the techniques described with reference to operation 830 may be utilized.

Operation 850 includes training a class detection model 155 based on a training dataset including an input dataset and a target dataset. In this case, the class detection model is trained to extract features from an input page image, and output a target prediction of the location (e.g., bounding box expressed as pixel coordinates) and label of each location in the image that contains a term identifying a class of people, if any such locations are found. As such the input training dataset may include at least some of the individual page images of augmented image set 844. The target training dataset may include at least some of the target locations and labels 845. For example, for each location, the target training dataset may utilize a label file that contains a class and the bounding box coordinates of the location. The class detection model 155 may also output a confidence score associated with each prediction.

During training, the input and target datasets may be split between training data and validation/testing data as needed, where each of the training data and validation data respectively contains corresponding label files and images. For example 80% of the data may be assigned for training, and 20% of the data may be assigned for validation. Weights may be initialized at random and updated as the training process runs. The training process may run for as many epochs as needed until metrics on the validation data reach acceptable levels (e.g., 95% precision and 90% recall for all classes). The training process outputs the weights of the model (which are then used for inference on new data).

A deep learning algorithm such as one or more neural networks (e.g., convolutional neural networks) may be used to develop the class detection model 155. The deep learning algorithm may be based on object detection. For example, a one-stage object detection algorithm that predicts bounding boxes over images. Examples of one-stage object detection algorithms that may be utilized include: any version of You only look once (YOLO), RetinaNet, Single Shot Detector (SSD), or the like. One advantage of using a one-stage object detection algorithm in an application for identifying specific types of elements when the document dataset is large (e.g., in the millions or billions) is that such algorithms are fast relative to other object detection algorithms such as two-stage object detection algorithms. This may be particularly advantageous in the present disclosure where two different object detection models (e.g., class detection model 155 and class discriminatory section detection model 165) may be applied to a given page image to recognize discriminatory section(s) in the image, thereby reducing any potential tradeoff in detection accuracy due to the use of a one-stage object detection algorithm.

In alternative implementations, a two-stage object detection algorithm may be utilized. For example, a Region-based Convolutional Neural Network (R-CNN) may be utilized.

An advantage of using an object detection model in the systems and methods described herein is its ability to both classify objects within an image and give the location of the object within the image. By contrast, other advanced vision models may only classify the object without tagging the location. Another advantage of using an object detection model is its ability to scale despite having high variability in the potential input images. For example, an alternative to using a vision-based model would be to OCR the image and rely on searches or build an NLP model that learns various patterns from raw text. However, as discussed above, such approaches may not scale with high image variability.

In other implementations, the class detection model 155 may be based on models other than object detection models.

Figure 10A:
FIG. 10A illustrates an additional example of a location within a document image containing a term identifying a class of people that was found using a class detection model trained, in accordance with some implementations of the disclosure.
Figure 10B:
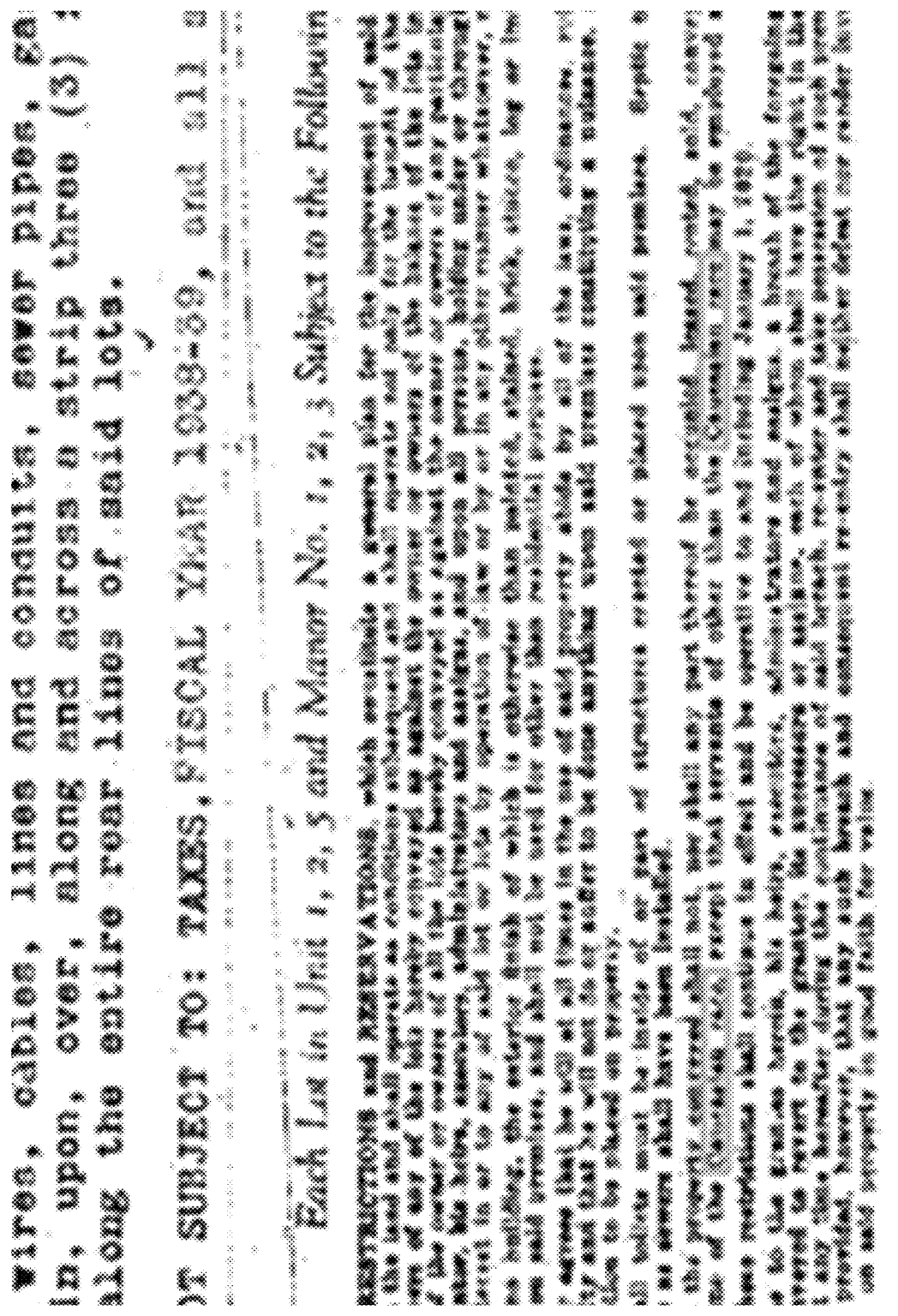
Figure 10C:
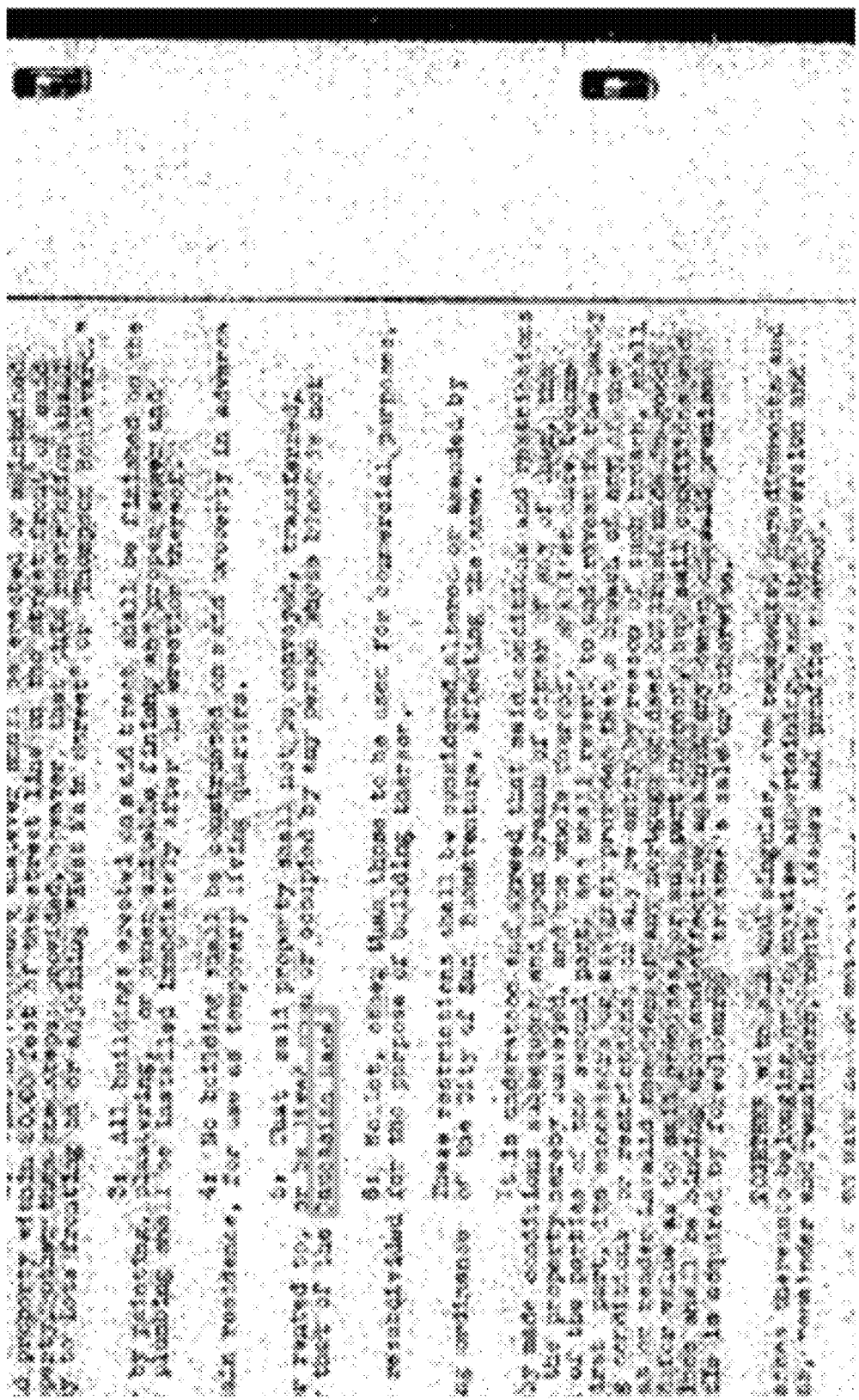
FIG. 10C illustrates an additional example of a location within a document image containing a term identifying a class of people that was found using a class detection model trained, in accordance with some implementations of the disclosure.

FIGS. 10A-10C illustrate three additional examples of locations within a document image containing a term identifying a class of people that were found using a class detection model trained in accordance with some implementations of the disclosure.

As alluded to above, while the foregoing class detection model 155 may, by itself, detect the presence of class terms in discriminatory contexts (i.e., detect true positives), it may also detect the presence of class terms in contexts that are not discriminatory (i.e., false positives). As such, the class discriminatory section detection model 165 may be built to identify the context in which class terms are used and reduce false positive identifications by the first model 155.

Figure 11:
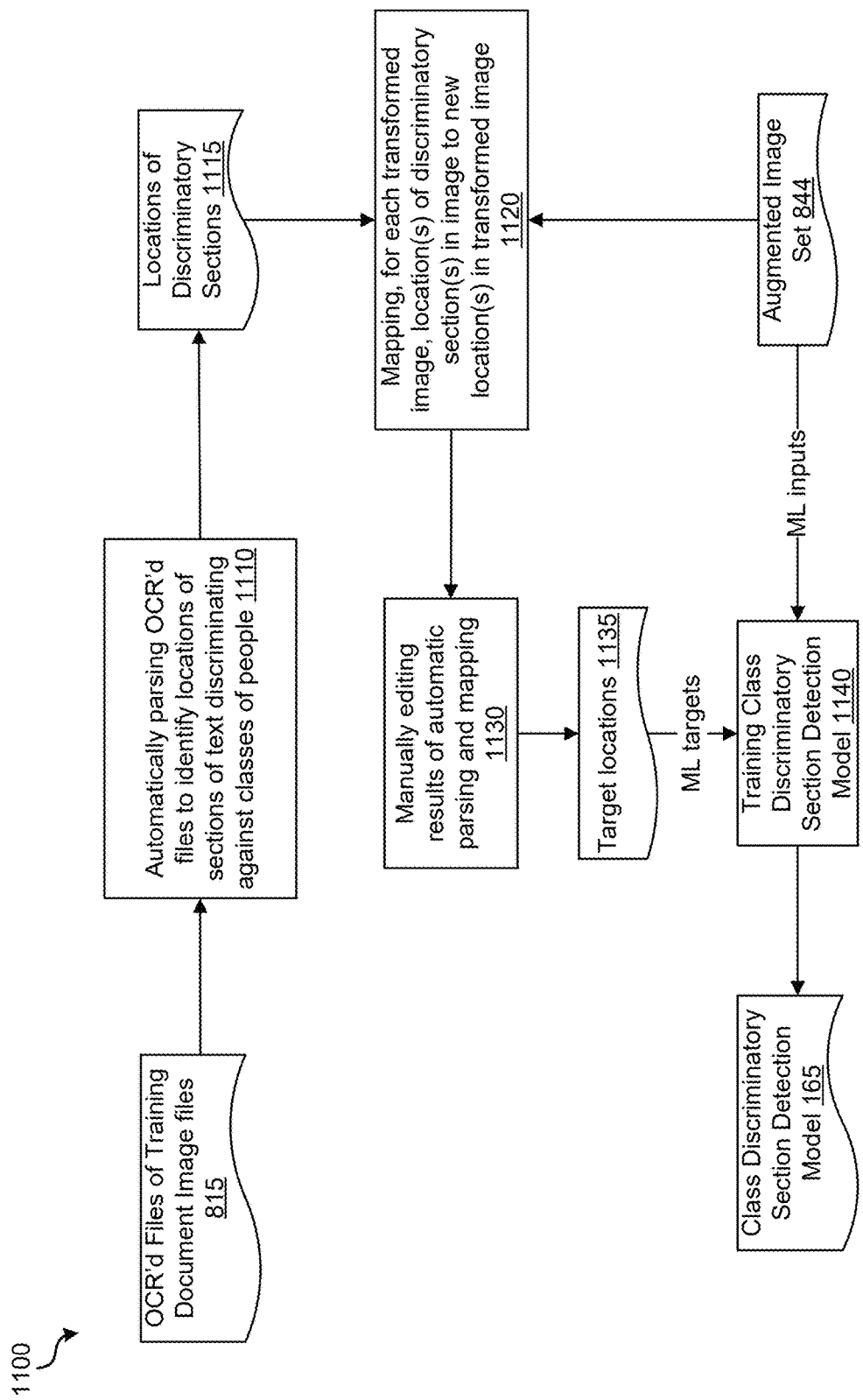
FIG. 11 is an operational flow diagram illustrating an example method of building a class discriminatory section detection model, in accordance with some implementations of the disclosure.

To this end, FIG. 11 is an operational flow diagram illustrating an example method 1100 of building a class discriminatory section detection model 165, in accordance with some implementations of the disclosure. As depicted, method 1100 may utilize the training documents, including the OCR'd files 815, previously obtained during training of class detection model 155. As also depicted, method 1100 may utilize the augmented image set 844 obtained during training of class detection model 155. As such, model 165 may be trained using the same set of images, and corresponding OCR'd files as model 155. In alternative implementations, OCR'd files 815 and/or an augmented image set 844 may be obtained during the process of training model 165 (e.g., if model 155 was not trained beforehand, or if a different set of document images are used for training).

Operation 1110 includes automatically parsing the OCR'd files 815 corresponding to the set of training document image files 814 to identify locations 1115 (e.g., bounding box coordinates) of sections of text discriminating against classes of people. A parser implementing regex rules adapted to find such sections may detect them within the OCR'd files 815. One or more regex rules may be used to identify sentences and paragraph bounding boxes that will be utilized as training data. The regex rules may configured to first identify a class term within a page, and one or more relevant contextual terms or phrases in proximity to the class term. For example, the regex rules may search for a racial term in proximity to at least one key phrase that can be used in a discriminatory context such "shall not be sold", "shall be sold", "not occupied", "occupied by", "other than those", "persons other than", "persons who are not", "person who is not", "person not of", and the like. A distance search such as a Levenshtein distance search may be conducted to determine that the proximity is sufficient. Following identification of a class term in proximity to a key phrase, the section (e.g., sentence or paragraph) containing the class term and key phrase may be identified. For each section identified on a given page, the parser may return its location. The location of sections (e.g., strings of text including sentences or paragraphs) returned by the parser may be mapped to pixel coordinates in a page of an image file corresponding to the OCR'd file 815 that was parsed. For example, the OCR output may be used to identify the coordinates for the start and the end of a paragraph or line, and the coordinates may be stored.

Operation 1120 includes mapping, for the transformed images of the augmented image set, locations of discriminatory sections 1115 identified in original training document images 814 to locations corresponding to the transformed images. In at least some transformed images (e.g., rotated images), it may be necessary to map the location of a section identified in an original image to a new location in a transformed image.

Operation 1130 includes manually editing the results of automatic parsing (operation 1110) and mapping (operation 1120) to obtain target locations 1135. For example, the system may present a GUI that displays, for each individual image, any identified locations of sections of text discriminating against classes of people. An identified location (e.g., pixel coordinates) may be displayed on its corresponding image as a bounding box in the image. The GUI may include one or more controls or tools for labeling missed sections, adjusting misaligned bounding boxes around identified sections, or removing labels of incorrectly identified sections. Additionally, the system may receive documents that were exclusively hand labeled with locations of sections. Such documents may be uploaded by the user.

Operation 1140 includes training the class discriminatory section detection model 165 based on a training dataset including an input dataset and a target dataset. In this case, the model 165 is trained to extract features from an input page image, and output a target prediction of the location (e.g., bounding box expressed as pixel coordinates) of each section in the image that contains text discriminating against a class of people, if any are found. As such the input training dataset may include at least some of the individual page images of augmented image set 844. The target training dataset may include at least some of the target locations 1135 identified by following the aforementioned operations. The class discriminatory section detection model 165 may also output a confidence score associated with each prediction.

As in the case of the class detection model 155, the class discriminatory section detection model 165 may be trained as an object detection model. For example, it may be based on a one-stage object detection algorithm such as YOLO, RetinaNet, SSD, or the like. Alternatively, it may be based on a two-stage object detection algorithm. In other implementations, the class discriminatory section detection model 165 may be based on models other than object detection models.

Figure 12A:
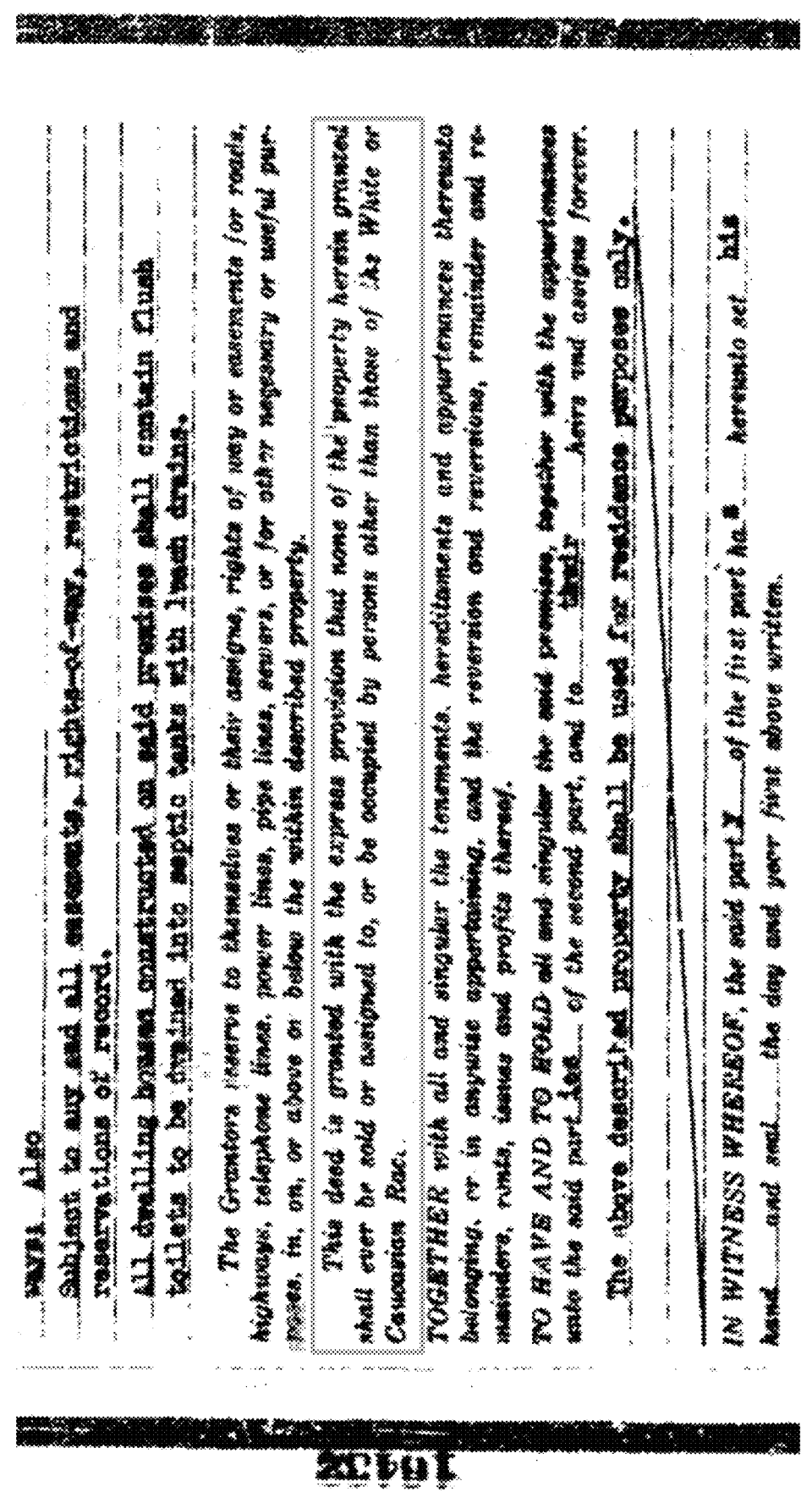
Figure 12B:
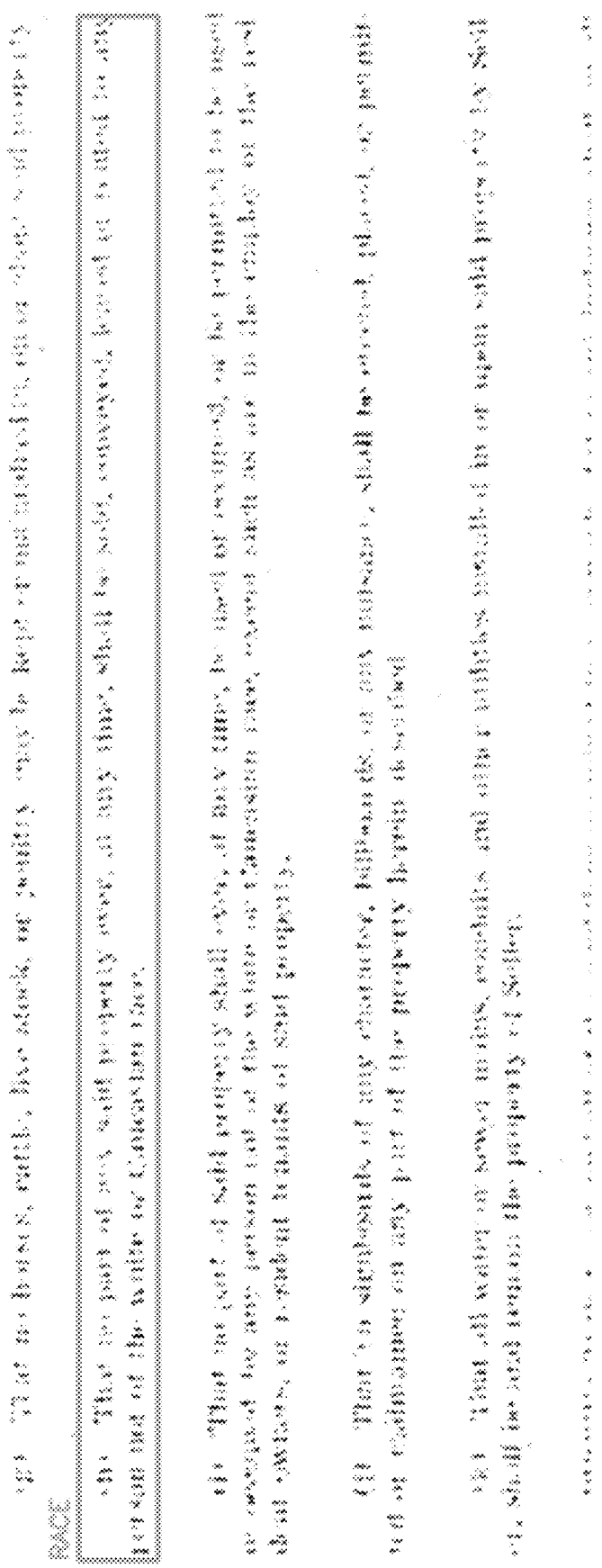
FIG. 12B illustrates an additional example of a location within a document image containing a section including text that discriminates against a class of people that was found using a class discriminatory section detection model trained in accordance with some implementations of the disclosure.
Figure 12C:
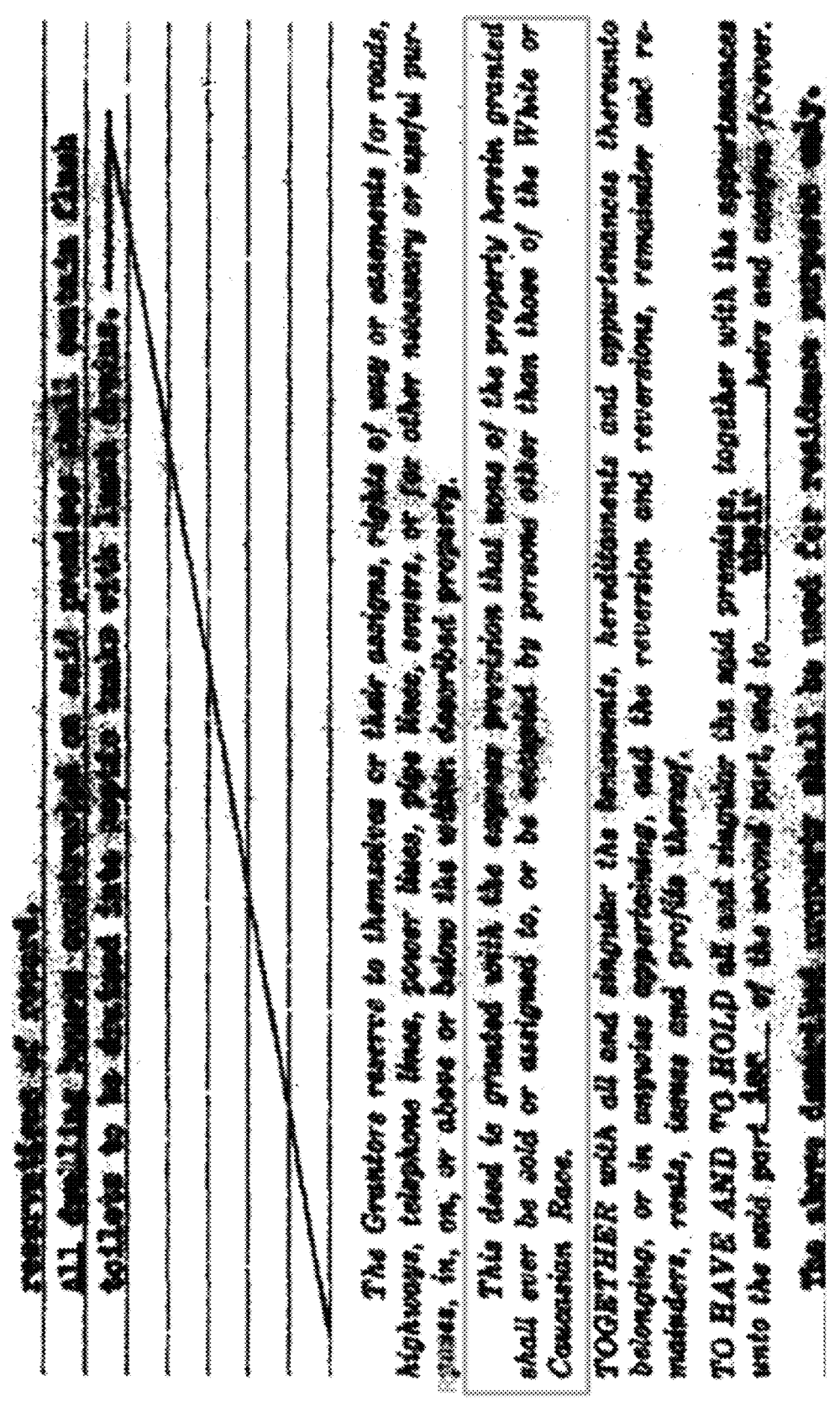

FIGS. 12A-12C illustrate three additional examples of locations within a document image containing a section including text that discriminates against a class of people that were found using a class discriminatory section detection model trained in accordance with some implementations of the disclosure.

Figure 13:
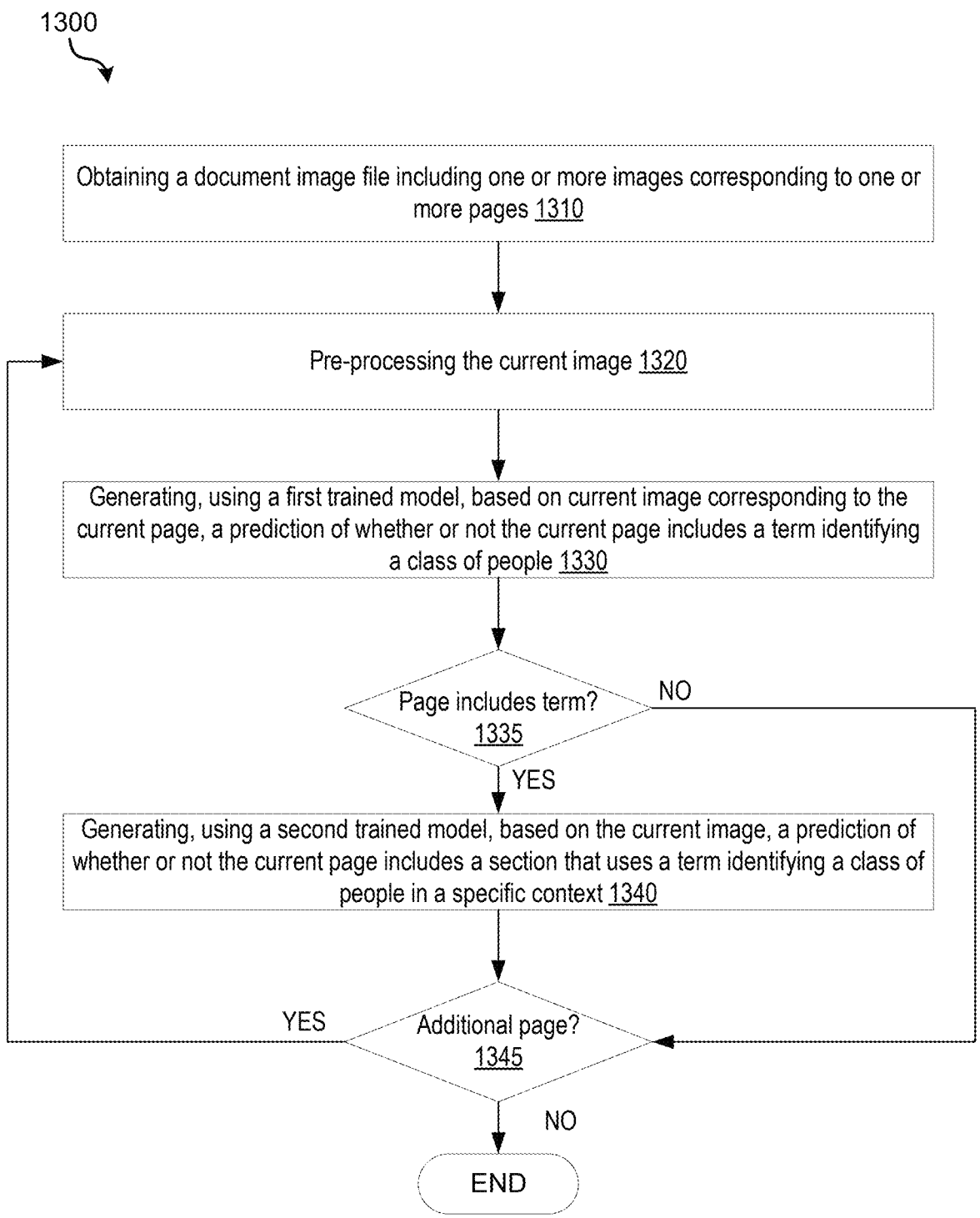
FIG. 13 is an operational flow diagram illustrating an example method that uses a two-stage approach for detecting the contextual use of terms identifying classes of people in document image files, in accordance with some implementations of the disclosure.

FIG. 13 is an operational flow diagram illustrating an example method 1300 that uses a two-stage approach for detecting the contextual use of terms identifying classes of people in document image files, in accordance with some implementations of the disclosure. Operation 1310 includes obtaining a document image file including one or more images corresponding to one or more pages.

Operation 1320 includes pre-processing the current image. Preprocessing may normalize the image so that the results of applying the models to different document images is more consistent. It may also adjust properties of the image to a state in which the models are more likely to generate an accurate prediction (e.g., as determined during testing of the models). For example, the image may be rotated, denoised, deblurred, have its brightness adjusted, have its contrast adjusted, and/or be processed in some other fashion. In some implementations, operation 1320 may be skipped.

Operation 1330 includes generating, using a first trained model, based on the current image corresponding to the current page, a prediction of whether or not the current page includes a term identifying a class of people. In some implementations, the first trained model is an object detection model that outputs a prediction including the location(s) of such term(s) and labels corresponding to such terms. For example, the first trained model may be a class detection model 155 as described above.

Decision 1335 includes determining if the first trained model predicted the presence of at least one term identifying a class of people. If not, the process may iterate for the remaining pages (decision 1345), if any. If yes, method 1330 may proceed to operation 1340, which includes generating, using a second trained model, based on the current image, a prediction of whether or not the current page includes a section that uses a term identifying a class of people in a specific context. The section may be a sentence or paragraph. In some implementations, the second trained model is an object detection model that outputs a prediction including the location(s) of such sections. The specific context may be a discriminatory context, although it is envisioned that the techniques described herein could also be applied to identify sections using terms identifying classes of people in other contexts. The second trained model may be a class discriminatory section detection model 165 as described above.

Thereafter, method 1300 may iterate for the remaining pages (decision 1345), if any.

In some implementations, a first location of a term identifying a class of people predicted by the first trained model may be compared to a second location of a section predicted by the second trained model. For example, a determination may be made as to whether the first location is partially or completely within the second location. For example, if the first location is a first bounding box defined by the following coordinates (x_min=1, x_max=4, y_min=1, y_max=4), and the second location is a second bounding box defined by the following coordinates (x_min=2, x_max=3, y_min=2, y_max=3), then the second bounding box is completely within the first bounding box. In some implementations, determining that the first location is within the second location comprises determining that a level of intersection between the first location and the second location meets a threshold. For example, the threshold may be that a percentage of area of the first location present in the second location is above a certain amount (e.g., at least 75%). This threshold may be user configurable. If the first location is within the second location, a label associated with the prediction made by the first trained model (e.g., "race", "religion", "marital status") may be assigned to or otherwise associated with the prediction made by the second trained model. For example, if the label assigned by applying the first trained model is "race" and the specific context predicted by the second trained is "discriminatory", then the prediction made by the second trained model may be associated with a label that indicates a section containing a discriminatory use of race. In this manner, the prediction output by the second trained model may only need to include location(s) of identified section(s), and the process of training and applying the second model may be simplified.

In some implementations, if a first location is not within a second location, then a prediction by the second trained model that the second location includes a section that uses a term identifying a class of people in the specific context may be flagged for manual review. One advantage of this approach is that it may avoid false positive identifications by the second trained model that are not confirmed by the first trained model. Alternatively, it may be used to confirm true positive predictions that are missed by the first trained model.

Figure 14:
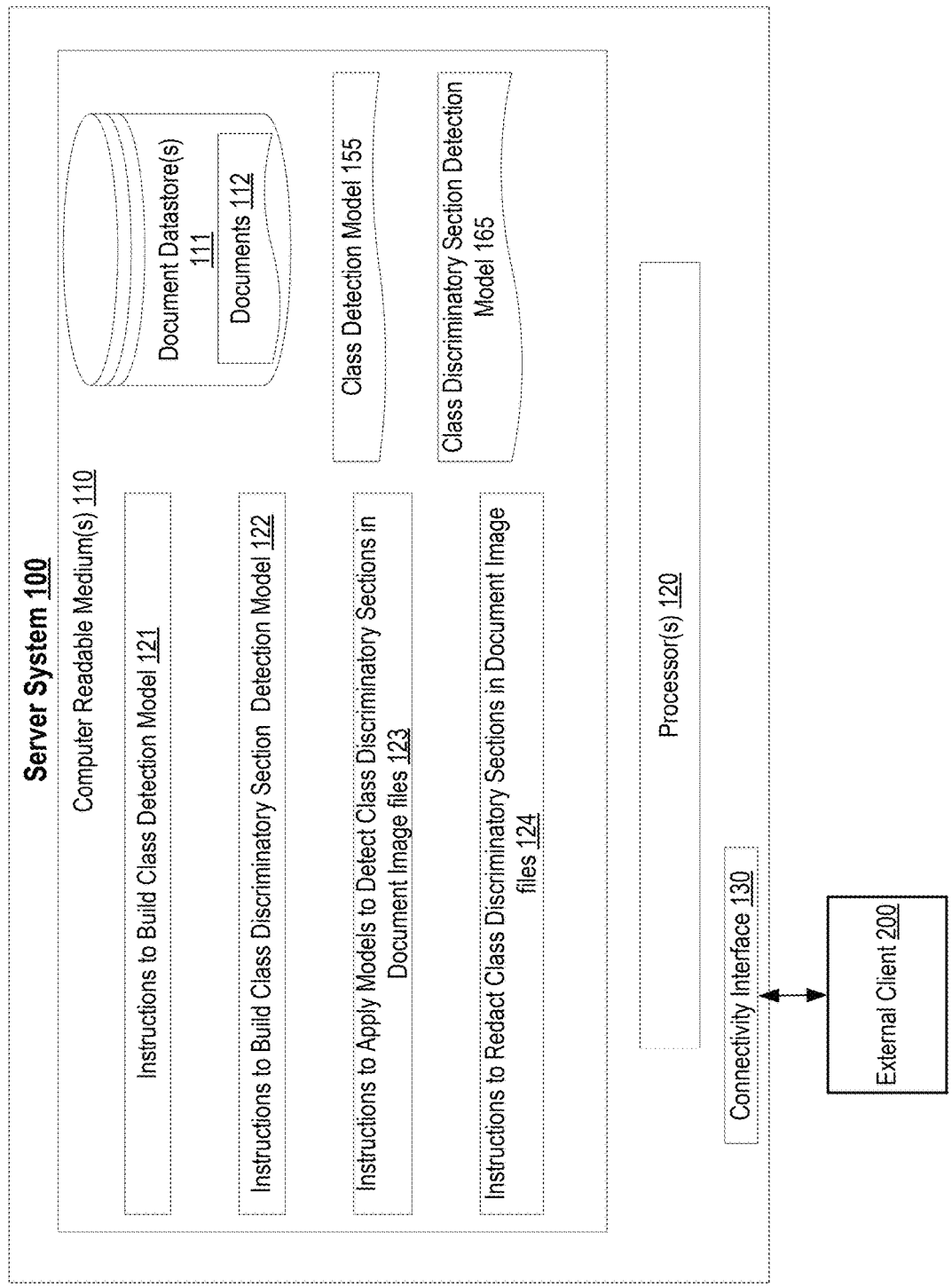
FIG. 14 is a block diagram illustrating a server system, in accordance with some implementations of the disclosure.

FIG. 14 is a block diagram illustrating a server system 100, in accordance with some implementations of the disclosure. The server system 100 comprises at least one computer readable medium 110 upon which are stored instructions that, when executed by a processor 120, cause server system 100 to carry-out implementations of the disclosure. Server system 100 further comprises, at least one processor 120, and a connectivity interface 130. In this example, at least one computer readable medium 110 includes at least one document datastore 111 storing documents 112, and trained models 155 and 165. The documents 112 may include thousands, millions, or even billions of documents stored in a document image format (e.g., pdf, png, tiff, etc.). For example, in implementations where server system 100 is utilized by a company in an industry relating to real property, these documents may comprise deeds and various other documents relating to parcels of real property from different states and counties.

In some implementations, all or a subset of the documents 112 may include documents having discriminatory sections that have been previously identified (e.g., by implementing the techniques described herein). The locations (e.g., image coordinates) of the identified sections may be stored along with the documents in the same or separate data files.

The at least one computer readable medium 110 also stores instructions 121 that, when executed by a processor 120, cause server system 100 to build a class detection model 155. For example, execution of instructions 121 may cause server system 100 to perform operations of method 800. The at least one computer readable medium 110 also stores instructions 122 that, when executed by a processor 120, cause server system 100 to build the class discriminatory section detection model 165. For example, execution of instructions 122 may cause server system 100 to perform operations of method 1100. The at least one computer readable medium 110 also stores instructions 123 that, when executed by a processor 120, cause server system 100 to apply the models to detect class discriminatory sections in document image files. For example, execution of instructions 123 may cause server system 100 to perform operations of method 1300, or operation 220. The at least one computer readable medium 110 further stores instructions 124 that, when executed by a processor 120, cause server system 100 to redact discriminatory sections in document files. For example, execution of instructions 124 may cause server system 100 to perform operation 240.

Connectivity interface 130 is configured to provide server system 100 with wired and/or wireless communication with external clients 200 via a direct and/or indirect connection over one or more communication networks.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored thereon that, when executed by a processor, cause the processor to perform operations comprising:

obtaining a document image file including a first image corresponding to a first page of a document;

generating, using a first trained model, based on the first image, a first prediction that the first page includes a term identifying a class of people, the first prediction including a first location of the term within the first image;

in response to generating the first prediction that the first page includes the term identifying the class of people, generating, using a second trained model, based on the first image, a second prediction of whether or not the first page includes a section that uses a term identifying the class of people in a specific context.

2. The non-transitory computer-readable medium of claim 1, wherein:

the second prediction is that the first page includes the section that uses the term identifying the class of people in the specific context; and the second prediction comprises a second location of the section.

3. The non-transitory computer-readable medium of claim 2, wherein the operations further comprise: in response to the second prediction being that the first page includes the section that uses the term identifying the class of people in the specific context, redacting, based on the second location of the section, the section within the first image.

4. The non-transitory computer-readable medium of claim 2, wherein the operations further comprise: in response to the second prediction being that the first page includes the section that uses the term identifying the class of people in the specific context, storing the second location and a page number of the first page in a datastore.

5. The non-transitory computer-readable medium of claim 4, wherein the first prediction further comprises a first confidence score;

the second prediction further comprises a second confidence score; and the operations further comprise: storing the first location, the first confidence score, and the second confidence score in the datastore.

6. The non-transitory computer-readable medium of claim 2, wherein the operations further comprise: redacting, based on the second location of the section, the section within the first image.

7. The non-transitory computer-readable medium of claim 2, wherein the specific context is a discriminatory context.

8. The non-transitory computer-readable medium of claim 7, wherein:

the document refers to a real property;

the class of people corresponding to the term used in the section comprises a race, color, religion, national origin, sex, or sexual orientation; and the section includes text restricting, based on race, color, religion, national origin, sex, or sexual orientation, the sale, use, lease, rent, or occupancy of the real property.

9. The non-transitory computer-readable medium of claim 2, wherein:

the first prediction further includes a label corresponding to the term identifying the class of people; and the operations further comprise:

determining that the first location is within the second location; and in response to determining that the first location is within the second location, associating the label with the section.

10. The non-transitory computer-readable medium of claim 2, wherein the operations further comprise:

determining that the first location is not within the second location; and in response to determining that the first location is not within the second location, presenting a graphical user interface for a user to review the section.

11. The non-transitory computer-readable medium of claim 1, wherein:

the document image file includes a second image of a second page of the document; and the operations further comprise:

generating, using the first trained model, based on the second image, a third prediction that the second page does not include any terms identifying classes of people; and in response to generating the third prediction, not using the second trained model to generate any predictions about the second page.

12. The non-transitory computer-readable medium of claim 1, wherein the operations further comprise generating the first trained model by:

obtaining multiple textual data representations of multiple document image files;

identifying, using at least regular expression-based rules, and the multiple textual data representations, multiple text strings within the multiple textual data representations that identify classes of people;

determining a location of each of the multiple text strings within the multiple document image files; and training, based on the multiple document image files and the locations of the multiple text strings, a model as the second trained model.

13. The non-transitory computer-readable medium of claim 12, wherein generating the first trained model further includes:

transforming the multiple document image files to obtain multiple transformed versions of the document image files;

determining a location of each of the multiple text strings within the multiple transformed versions of the document image files; and training, based on the multiple transformed versions of the document image files and the locations of the multiple text strings within the transformed versions of the document image files, the model as the second trained model.

14. A method, comprising:

obtaining, at a computing device, a document image file including a first image corresponding to a first page of a document;

generating, at the computing device, using a first trained model, based on the first image, a first prediction that the first page includes a term identifying a class of people, the first prediction including a first location of the term within the first image;

in response to generating the first prediction that the first page includes the term identifying the class of people, generating, at the computing device, using a second trained model, based on the first image, a second prediction of whether or not the first page includes a section that uses a term identifying the class of people in a specific context.

15. The method of claim 14, wherein:
the second prediction is that the first page includes the section that uses the term identifying the class of people in the specific context; and
the second prediction comprises a second location of the section.

16. The method of claim 15, further comprising: in response to the second prediction being that the first page includes the section that uses the term identifying the class of people in the specific context, redacting, at the computing device, based on the second location of the section, the section within the first image.

17. The method of claim 15, further comprising: in response to the second prediction being that the first page includes the section that uses the term identifying the class of people in the specific context, storing the second location and a page number of the first page in a datastore.

18. The method of claim 15, further comprising: redacting, based on the second location of the section, the section within the first image.

19. The method of claim 15, wherein the specific context is a discriminatory context.

20. A system, comprising:
a processor; and
a non-transitory computer-readable medium having executable instructions stored thereon that, when executed by the processor, cause the processor to perform operations comprising:
obtaining a document image file including a first image corresponding to a first page of a document;
generating, using a first trained model, based on the first image, a first prediction that the first page includes a term identifying a class of people, the first prediction including a first location of the term within the first image; and
in response to generating the first prediction that the first page includes the term identifying the class of people, generating, using a second trained model, based on the first image, a second prediction of whether or not the first page includes a section that uses a term identifying the class of people in a specific context.

* * * * *